US012422188B2

(12) United States Patent
Iglauer et al.

(10) Patent No.: US 12,422,188 B2
(45) Date of Patent: Sep. 23, 2025

(54) TREATMENT INSTALLATION AND METHOD FOR TREATING WORKPIECES

(71) Applicant: Dürr Systems AG, Bietigheim-Bissingen (DE)

(72) Inventors: Oliver Iglauer, Stuttgart (DE); Kevin Woll, Ilsfeld (DE); Dietmar Wieland, Waiblingen (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 347 days.

(21) Appl. No.: 16/060,821

(22) PCT Filed: Dec. 12, 2016

(86) PCT No.: PCT/EP2016/080699
§ 371 (c)(1),
(2) Date: Jun. 8, 2018

(87) PCT Pub. No.: WO2017/098056
PCT Pub. Date: Jun. 15, 2017

(65) Prior Publication Data

US 2018/0356154 A1 Dec. 13, 2018

(30) Foreign Application Priority Data

Dec. 10, 2015 (DE) ..................... 10 2015 224 916.6
Oct. 20, 2016 (WO) ................. PCT/EP2016/075206

(51) Int. Cl.
*F26B 15/14* (2006.01)
*F24H 3/08* (2022.01)
(Continued)

(52) U.S. Cl.
CPC ............. *F26B 15/14* (2013.01); *F24H 3/087* (2013.01); *F26B 21/02* (2013.01); *F26B 21/04* (2013.01);
(Continued)

(58) Field of Classification Search
CPC .......... F26B 15/14; F26B 21/04; F26B 15/12; F26B 21/02; F26B 23/02; F26B 2210/12;
(Continued)

(56) References Cited

U.S. PATENT DOCUMENTS 2,970,811 A 2/1961 Ruch et al.
4,132,007 A * 1/1979 Voorheis .............. F26B 23/022 34/514

(Continued)

FOREIGN PATENT DOCUMENTS

CA 2113807 2/1993
CA 2269982 5/1998

(Continued)

OTHER PUBLICATIONS

International Searching Authority, "English Translation of International Preliminary Report on Patentability," issued in connection with International Application No. PCT/EP2016/075206, on Jun. 12, 2018, 5 pages.

(Continued)

*Primary Examiner* — Edelmira Bosques
*Assistant Examiner* — Bao D Nguyen
(74) *Attorney, Agent, or Firm* — Hanley, Flight & Zimmerman, LLC

(57) ABSTRACT

In order to provide a treatment installation which is of simple construction and enables an energy-efficient workpiece treatment, it is proposed that the treatment installation comprises the following:

a treatment chamber which comprises multiple treatment chamber sections that are each associated with one of multiple separate circulatory air modules of the treatment installation;

a heating installation which comprises a heating gas conduit, wherein multiple circulatory air modules are coupled to (Continued)

the heating gas conduit, in particular for heating the gas guided through the treatment chamber sections.

26 Claims, 21 Drawing Sheets

(51) Int. Cl.
*F26B 21/02* (2006.01)
*F26B 21/04* (2006.01)
*F26B 23/02* (2006.01)
*F28D 7/00* (2006.01)

(52) U.S. Cl.
CPC ............ *F26B 23/02* (2013.01); *F28D 7/0066* (2013.01); *F26B 2210/12* (2013.01)

(58) Field of Classification Search
CPC ...... F26B 23/022; F24H 3/087; F28D 7/0066; F23J 15/00
USPC ............................................................ 34/208
See application file for complete search history.

(56) References Cited

U.S. PATENT DOCUMENTS

| | | | | |
|---|---|---|---|---|
| 4,140,467 | A * | 2/1979 | Ellison | F26B 23/022 110/204 |
| 4,326,342 | A * | 4/1982 | Schregenberger | B05D 3/04 34/538 |
| 4,499,943 | A | 2/1985 | Schäfer | |
| 4,656,758 | A | 4/1987 | Nakayama | |
| 4,771,552 | A | 9/1988 | Morioka | |
| 5,061,177 | A | 10/1991 | Knipiler et al. | |
| 5,279,278 | A | 1/1994 | Logtens et al. | |
| 5,456,023 | A * | 10/1995 | Farnan | F26B 21/004 34/88 |
| 5,477,846 | A | 12/1995 | Cameron | |
| 5,659,975 | A | 8/1997 | Bahner et al. | |
| 5,868,562 | A | 2/1999 | Watanabe et al. | |
| 5,868,565 | A * | 2/1999 | Nowack | F27D 99/0075 432/64 |
| 6,062,850 | A * | 5/2000 | Ino | F26B 3/283 432/143 |
| 6,192,604 | B1 * | 2/2001 | Morrison | B05B 16/20 34/210 |
| 6,264,547 | B1 | 7/2001 | Wälti | |
| 6,418,636 | B1 | 7/2002 | Sonner | |
| 6,935,052 | B2 | 8/2005 | Sonner et al. | |
| 7,200,953 | B2 | 4/2007 | Sonner et al. | |
| 8,393,895 | B2 | 3/2013 | Schwartz et al. | |
| 9,322,594 | B2 | 4/2016 | Bruckner | |
| 9,394,110 | B2 | 7/2016 | Robbin | |
| 9,423,179 | B2 | 8/2016 | Wieland et al. | |
| 2002/0148137 | A1 | 10/2002 | Eisenacher et al. | |
| 2004/0261285 | A1 * | 12/2004 | Harada | F26B 23/001 34/514 |
| 2006/0068094 | A1 | 3/2006 | Cole | |
| 2007/0144036 | A1 | 6/2007 | Katefidis et al. | |
| 2011/0023314 | A1 | 2/2011 | Schwerer et al. | |
| 2013/0014406 | A1 * | 1/2013 | Weschke | F26B 23/001 34/380 |
| 2013/0232801 | A1 | 9/2013 | Wieland et al. | |
| 2013/0312277 | A1 | 11/2013 | Hihn | |
| 2014/0020258 | A1 | 1/2014 | Hihn et al. | |
| 2014/0173928 | A1 | 6/2014 | Hauser | |
| 2014/0352169 | A1 | 12/2014 | Katefidis | |
| 2015/0089827 | A1 | 4/2015 | Sluka et al. | |
| 2015/0121720 | A1 | 5/2015 | Wieland et al. | |
| 2015/0276315 | A1 | 10/2015 | Schindler et al. | |
| 2015/0354890 | A1 | 12/2015 | Sluka | |

FOREIGN PATENT DOCUMENTS

| | | | | |
|---|---|---|---|---|
| CN | 103822510 | | 5/2014 | |
| CN | 103946655 | | 7/2014 | |
| DE | 19735322 | | 2/1999 | |
| DE | 19756194 | | 7/1999 | |
| DE | 19937193 | | 2/2001 | |
| DE | 10045608 | | 3/2002 | |
| DE | 10128794 | | 1/2003 | |
| DE | 10147199 | | 4/2003 | |
| DE | 102008024088 | | 1/2009 | |
| DE | 102008012792 | A1 | 9/2009 | |
| DE | 102008034746 | | 2/2010 | |
| DE | 102008046492 | | 3/2010 | |
| DE | 102009001640 | | 9/2010 | |
| DE | 10 2009 021 004 | A1 | 10/2010 | |
| DE | 102010001234 | | 7/2011 | |
| DE | 102010006550 | | 8/2011 | |
| DE | 102010027556 | | 6/2012 | |
| DE | 102011076469 | | 7/2012 | |
| DE | 102011017354 | | 10/2012 | |
| DE | 202011104983 | | 11/2012 | |
| DE | 102011114104 | | 3/2013 | |
| DE | 102011117666 | | 5/2013 | |
| DE | 102012007276 | | 10/2013 | |
| DE | 102012007769 | A1 | 10/2013 | |
| DE | 102012018296 | | 10/2013 | |
| DE | 102012207312 | A1 | 11/2013 | |
| DE | 102012020357 | | 4/2014 | |
| DE | 102012023457 | | 6/2014 | |
| DE | 102012222688 | | 6/2014 | |
| DE | 102013203089 | | 8/2014 | |
| DE | 102013004131 | | 9/2014 | |
| DE | 102013004136 | | 9/2014 | |
| DE | 102014003912 | | 9/2015 | |
| EP | 0 528 455 | A1 | 2/1993 | |
| EP | 0849001 | A1 | 6/1998 | |
| EP | 1302737 | | 4/2003 | |
| EP | 1967804 | | 9/2008 | |
| EP | 1998129 | | 12/2008 | |
| EP | 2775241 | A2 | 9/2014 | |
| EP | 2775241 | A3 | 1/2015 | |
| EP | 2924381 | | 9/2015 | |
| JP | 46035087 | | 12/1971 | |
| JP | 62192199 | | 12/1987 | |
| JP | H0810679 | | 1/1996 | |
| JP | 2000334367 | | 12/2000 | |
| JP | 2001259503 | | 9/2001 | |
| JP | 2006026476 | | 2/2006 | |
| JP | 2008093578 | | 4/2008 | |
| JP | 4171226 | | 10/2008 | |
| JP | 2009195840 | | 9/2009 | |
| WO | 99/57498 | A1 | 11/1999 | |
| WO | 02073109 | | 9/2002 | |
| WO | WO-2010122121 | A2 * | 10/2010 | B05D 3/0209 |

OTHER PUBLICATIONS

International Searching Authority, "English Translation of International Preliminary Report on Patentability," issued in connection with International Application No. PCT/EP2016/080699, on Jun. 12, 2018, 7 pages.
International Searching Authority, "English Translation of International Search Report," issued in connection with International Application No. PCT/EP2016/075206, on Jan. 31, 2017, 2 pages.
European Patent Office, "Office Action," issued in connection with European Patent Application No. 16819831.5, dated Apr. 8, 2020, 11 pages.
European Patent Office, "Office Action," issued in connection with European Patent Application No. 16784891.0, dated Apr. 8, 2020, 11 pages.
Rough English Machine Translation of: German Patent Office, "Office Action," issued in connection with German Application No. 10 2015 017 273.5, on Sep. 26, 2018, 14 pages.
Chinese Patent Office, "First Office Action," issued in connection with Chinese Patent Application No. 201680071840.4, dated Dec. 26, 2019, 34 pages. Rough machine translation included.

(56) References Cited

OTHER PUBLICATIONS

Japanese Patent Office, "Notice of Reasons for Refusal," issued in connection with Japanese Patent Application No. 2018-529125, mailed on Mar. 16, 2021, 10 pages. English translation included.
European Patent Office, "Extended European Search Report," issued in connection with European Patent Application No. 20 179 791.7, mailed on Sep. 8, 2020, 18 pages. Rough English machine translation included.
European Patent Office, "Extended European Search Report," issued in connection with European Patent Application No. 20 179 795.8, mailed on Sep. 11, 2020, 27 pages. Rough English machine translation included.
European Patent Office, "Extended European Search Report," issued in connection with European Patent Application No. 20 179 796.6, mailed on Sep. 4, 2020, 29 pages. Rough English machine translation included.
Japanese Patent Office, "Notice of Reasons for Refusal," issued in connection with Japanese Patent Application No. 2018-529125, mailed on Oct. 15, 2020, 16 pages. English translation included.
European Patent Office, Extended European Search Report, issued in connection with European Application No. 20182366.3, mailed on Jan. 25, 2021, 17 pages.
European Patent Office, "Extended European Search Report," issued in connection with European Patent Application No. 23212266.3, Mar. 20, 2024, 14 pages, with machine English translation.

* cited by examiner

TREATMENT INSTALLATION AND METHOD FOR TREATING WORKPIECES

RELATED APPLICATION

This application is a national phase of international application No. PCT/EP2016/080699 filed on Dec. 12, 2016, and claims the benefit of German application No. 10 2015 224 916.6 filed on Dec. 10, 2015 and international application No. PCT/EP2016/075206 filed on Oct. 20, 2016, which are incorporated herein by reference in their entirety and for all purposes.

FIELD OF DISCLOSURE

The present invention relates to a treatment installation and a method for treating workpieces. In particular, a treatment installation serves to dry coated vehicle bodies. The method for treating workpieces is thus in particular a method for drying coated vehicle bodies.

BACKGROUND

Treatment installations and treatment methods are known in particular from EP 1 998 129 B1, US 2006/0068094 A1, EP 1 302 737 A2, and WO 02/073109 A1.

SUMMARY OF THE INVENTION

The object underlying the present invention is to provide a treatment installation which is of simple construction and enables an energy-efficient workpiece treatment.

This object is achieved in accordance with the invention in that the treatment installation for treating workpieces comprises the following:

- a treatment chamber which comprises multiple treatment chamber sections that are each associated with one of multiple separate circulatory air modules of the treatment installation;
- a heating installation which comprises a heating gas conduit, wherein multiple circulatory air modules are coupled to the heating gas conduit, in particular for heating the gas guided through the treatment chamber sections.

Therein that the treatment installation in accordance with the invention comprises a heating installation having a heating gas conduit, which is coupled to the circulatory air modules, the gas to be supplied to the treatment chamber sections is heatable in a simply and efficient manner. The treatment installation may hereby preferably be operated in a particularly energy-efficient manner.

The heating gas conduit is preferably self-contained, for example configured to be annularly closed, such that at least a partial gas stream of a heating gas stream guided in the heating gas conduit flows through the heating gas conduit multiple times.

The heating gas is preferably a crude gas and/or pure gas which is suitable and/or provided for use in the treatment chamber, i.e. for flowing though the treatment chamber.

The heating gas preferably has, at least immediately upstream of the treatment chamber sections, an increased temperature compared to the gas stream in the circulatory air modules and/or treatment chamber section.

The heating gas is preferably not an exhaust gas of a heating device of the heating installation, in particular not a combustion exhaust gas.

"Self-contained heating gas conduit" is to be understood in particular as a heating gas conduit in which at least a portion of a heating gas stream is guided in a circuit. Independently thereof, a continuous or phased supply of fresh gas to the heating gas stream and/or removal of heating gas from the heating gas stream may also be provided in a self-contained heating gas conduit.

It may be favorable if a supply of fresh gas and a removal of heating gas, i.e. an exchange of heating gas, is preferably dimensioned such that, in a single pass-through of the heating gas stream through the heating gas conduit, at least 40%, preferably at least about 50%, in particular at least about 80%, for example at least about 90%, of the heating gas stream flowing past a certain position in the heating gas conduit again returns to said position after the complete pass-through.

The supply of fresh gas and/or the removal of heating gas from the heating gas stream preferably occurs exclusively in the treatment chamber sections and/or the circulatory air modules of the treatment installation.

Provision may also be made, however, for a fresh gas supply and/or an exhaust gas discharge to be associated with the heating installation, by means of which the fresh gas may be supplied and heating gas may be removed from the heating gas stream, respectively, outside of the treatment chamber sections and/or outside of the circulatory air modules.

The circulatory air modules and/or the treatment chamber sections are preferably a constituent part of the heating gas conduit.

In particular, the heating gas is preferably able to be guided at least partially through the treatment chamber sections multiple times before it (again) flows through the part of the heating gas conduit lying outside of the circulatory air modules and/or outside of the treatment chamber sections.

In an embodiment of the invention, provision may be made for the heating gas conduit to comprise a circulatory air conduit which is formed in sections by multiple circulatory air modules and/or treatment chamber sections which are arranged in parallel.

In the circulatory air modules and/or treatment chamber sections, a gas stream is preferably guidable in a circulatory air circuit to which heating gas from the heating gas conduit is suppliable. Preferably, a partial gas stream of the gas stream, guided in the circuit, of each one circulatory air module and/or treatment chamber section is removable from the circulatory air module and/or the treatment chamber section, is guidable in a closed circuit by means of the heating gas conduit, and is finally suppliable again as part of the heating gas stream to one or more circulatory air modules and/or treatment chamber sections.

Preferably, the treatment installation comprises a conveying device by means of which the workpieces are suppliable to the treatment chamber, are removable from the treatment chamber, and/or are conveyable through the treatment chamber in a conveying direction of the conveying device.

The treatment chamber sections and/or the circulatory air modules are preferably arranged successively in the conveying direction.

It may be favorable if the circulatory air modules are mutually independent circulatory air modules.

A circulatory air module, in particular each circulatory air module, preferably comprises the following:

- a gas supply for supplying gas to the treatment chamber section; and/or a gas discharge for removing gas from the treatment chamber section; and/or a blower device for driving a (circulatory air) gas stream; and/or a separating device for separating impurities out of the (circulatory air) gas stream; and/or a distributing device for distributing the (circulatory air) gas stream, which is to be supplied to the treatment chamber section, to multiple inlet openings of the gas supply; and/or a collecting device by means of which the (circulatory air) gas stream removed from the treatment chamber through multiple outlet openings (return openings) of the gas discharge is combinable.

Each circulatory air module preferably forms together with the associated treatment chamber an, in particular complete, section of the treatment installation.

In this description and the accompanying claims, the term “circulatory air” is not necessarily fixed to the gas “air”. Rather, the term “circulatory air” preferably designates a gas guided in a circuit (circulatory air circuit), which in particular is processed and/or reused multiple times.

Likewise, the terms “supply air”, “supply air stream”, “exhaust air”, and “exhaust air stream” are not necessarily fixed to the gas “air”, but rather designate more generally a gas supplied to the circulatory air circuit (supply air, supply air stream) and a gas removed from the circulatory air circuit (exhaust air, exhaust air stream), respectively.

In an embodiment of the invention, provision may be made for the heating installation to comprise a heating device and a heat exchanger by means of which heat produced in the heating device is transferrable to a heating gas guided in the heating gas conduit.

The heat exchanger is in particular arranged in an exhaust gas tract of the heating device in order to be able to use heat contained in the exhaust gas of the heating device to heat the heating gas.

It may be advantageous if the treatment installation comprises a fresh gas supply, which is different from and/or independent of the heating installation, by means of which fresh gas supply fresh gas is suppliable to the treatment chamber.

The fresh gas is preferably suppliable to the gas stream guided in the circulatory air modules and/or treatment chamber sections and thus to the treatment chamber, independently of a heating gas stream.

Provision may further be made for the fresh gas stream to be used at least partially as an airlock gas stream and to be supplied to the treatment chamber in this way.

It may be advantageous if the treatment installation comprises a fresh gas supply, by means of which fresh gas is suppliable to a heating gas stream guided in the heating gas conduit.

The fresh gas supply is preferably controllable and/or regulatable by means of a control device, in particular depending on a current heat requirement in the treatment chamber.

It may be favorable if a fresh gas stream having at least approximately constant volumetric flow and/or mass flow is suppliable to one or more airlocks, in particular an inlet airlock and/or an outlet airlock.

Alternatively or in addition hereto, provision may be made for a fresh gas stream having variable volumetric flow and/or mass flow to be suppliable to one or more airlocks, in particular an inlet airlock and/or an outlet airlock.

An at least approximately constant volumetric flow and/or mass flow is in particular temporally independent of a current heat requirement in the treatment chamber.

A variable volumetric flow and/or mass flow is preferably adapted to and/or controlled and/or regulated depending on a current heat requirement in the treatment chamber.

Provision may further be made for a fresh gas stream having at least approximately constant volumetric flow and/or mass flow to be suppliable to the heating gas stream.

Alternatively or in addition hereto, provision may be made for a fresh gas stream having variable volumetric flow and/or mass flow to be suppliable to the heating gas stream.

A fresh gas stream, which in particular has an at least approximately constant volumetric flow and/or mass flow, is preferably selected such that, therewith, an average fresh air requirement of the treatment installation of at least about 30%, in particular at least about 40%, for example about 50%, is covered. Said fresh gas stream is in particular a fresh gas stream supplied to the one or more airlocks.

A further fresh gas stream which in particular has a variable volumetric flow and/or mass flow is preferably selected such that, therewith, an average fresh air requirement of the treatment installation of at least about 30%, in particular at least about 40%, for example about 50%, is covered. Said fresh gas stream is in particular a fresh gas stream supplied centrally to the heating gas stream.

The fresh gas supply is preferably coupled to the exhaust gas tract of the heating device by a heat exchanger, in particular in order to transfer heat from the exhaust gas of the heating device to the fresh gas to be supplied by means of the fresh gas supply.

The heat exchanger for heating the fresh gas is preferably a heat exchanger which is different from the heat exchanger for heating the heating gas.

Alternatively hereto, provision may be made for mutually different sections of a common heat exchanger to serve to heat the fresh gas, on the one hand, and to heat the heating gas on the other. The fresh gas supply and the heating gas conduit then in particular have a common heat exchanger. In particular, a cold side of the heat exchanger is then preferably subdivided into multiple segments. In particular, multiple segments which are configured to allow mutually independent through-flow and which are fluidically disconnected from each other are provided.

The treatment installation preferably comprises one or more airlocks which in particular are configured as fresh gas airlocks and through which fresh gas flows or is able to flow.

Alternatively or in addition hereto, provision may be made for the treatment installation to comprise one or more circulatory air airlocks through which circulatory air, i.e. a gas stream guided in a circuit, flows or is able to flow. For this purpose, provision may be made in particular for each circulatory air airlock to be associated with a circulatory air module.

In particular if the treatment installation comprises circulatory air airlocks, provision may be made for a fresh gas stream to admixed or admixable directly to the heating gas stream. As a result, a separate fresh gas line for supplying fresh gas to the treatment chamber may be expendable.

It may be advantageous if the heating gas conduit comprises a central heating gas line, in which heating gas is guided or guidable, and by means of which the heating gas from the heating gas conduit is suppliable to the multiple circulatory air modules and/or treatment chamber sections, wherein the heating gas is directly or indirectly introducible via the circulatory air modules into the respective treatment chamber sections.

The heating gas conduit thus preferably forms a supply air conduit for supplying supply air to the circulatory air circuits in the treatment chamber sections.

Provision may further be made for the heating gas conduit to comprise a central heating gas line, in which heating gas is guided or guidable, and by means of which gas is removable from the circulatory air modules and/or the treatment chamber sections.

The heating gas conduit thus preferably forms an exhaust air conduit for removing exhaust air from the gas streams guided in the circulatory air modules in the circuit.

It may be favorable if the heating gas conduit comprises a central heating gas line, by means of which a heating gas is annularly guidable from a heat exchanger for heating the heating gas to the multiple circulatory air modules and/or treatment chamber sections and again back to the heat exchanger.

Alternatively or in addition hereto, provision may be made for the heating gas conduit to comprise a central heating gas line, by means of which gas, which serves in particular as heating gas, is removable from one or more circulatory air modules and/or treatment chamber sections and is suppliable to a heat exchanger for the heating thereof, and is then guidable back to the one or more circulatory air modules and/or treatment chamber sections.

The heating gas guided in the heating gas conduit is preferably drivable by means of exactly one blower or by means of multiple blowers.

Provision may be made for the heating gas conduit to comprise multiple bifurcations or branchings for distributing a heating gas stream, guided in the heating gas conduit, to the circulatory air modules and/or treatment chamber sections.

In particular, provision may be made for the heating gas conduit to comprise a main supply line which extends along the circulatory air modules and/or treatment chamber sections and out of which portions or the heating gas stream are able to branch off and are suppliable to the respective circulatory air modules and/or treatment chamber sections.

The main supply line may for example run outside of the treatment chamber, in particular outside of all treatment chamber sections, and or in parallel to the conveying direction.

The main supply line preferably extends at least approximately over an entire length of the treatment chamber, in particular in order to be able to supply all circulatory air conduits with heating gas.

Provision may further be made for the main supply line to run within the treatment chamber and/or in parallel to the conveying direction. For example, the main supply line may be arranged in an intermediate region between two conveying units of the conveying device, which run in parallel to each other and in parallel to the conveying direction.

The main supply line is preferably integrated into a base of the treatment chamber or arranged immediately on the base of the treatment chamber.

It may be favorable if the main supply line extends under the workpieces to be treated and/or is arranged entirely beneath the workpieces to be treated, in particular directly under the workpieces to be treated. As a result, the main supply line may contribute, in particular by heat radiation and/or by convection, to heating the gas stream guided through the treatment chamber and/or to heating the workpieces to be treated.

The main supply line extends in particular through all treatment chamber sections and/or into all treatment chamber sections.

Provision may be made for the main supply line to be configured as a rectangular channel which has a width taken perpendicularly to the conveying direction that is at least threefold, in particular at least fivefold, for example at least tenfold, of a height of the main supply line taken perpendicularly to the conveying direction.

It may be favorable if the main supply line opens via inlet valves directly into return lines of the circulatory air modules and/or circulatory air conduits.

By means of the bifurcations or branchings, the heating gas stream is preferably divisible in order to ultimately obtain multiple supply air streams for supplying the heating gas to the circulatory air modules and/or treatment chamber sections.

It may be favorable if the heating gas conduit has a main branching, by means of which a heating gas total stream is divisible into a first heating gas partial stream and a second heating gas partial stream, wherein the first heating gas partial stream is suppliable to a first circulatory air module or first to nth circulatory air module and/or first treatment chamber section or first to nth treatment chamber section, with respect to a conveying direction of a conveying device of the treatment installation, and wherein the second heating gas partial stream is preferably apportionable to all further circulatory air modules and/or treatment chamber sections.

The first circulatory air module is preferably a circulatory air module associated with a treatment chamber section. Provision may also be made, however, for said first circulatory air module to be a circulatory air module associated with a circulatory air airlock.

It may be favorable if the heating gas conduit comprises multiple junctions for combining multiple gas streams removed from the circulatory air modules and/or treatment chamber sections.

As a result, exhaust air streams from the circulatory air modules and/or treatment chamber sections are in particular preferably combinable and reheatable as a heating gas total stream and finally resuppliable to the air circulatory air modules and/or treatment chamber sections.

Provision may be made for the heating gas conduit to have a main junction, by means of which an exhaust gas stream of a first circulatory air module or first to nth circulatory air module and/or first treatment chamber section or first to nth treatment chamber section, with respect to a conveying direction of the conveying device of the treatment installation, is combinable with an already combined exhaust gas stream of all further circulatory air modules and/or treatment chamber sections.

The use of a main branching and/or main junction may in particular serve to reduce channel cross sections of a main supply line and/or of a main discharge line of the heating gas line, in particular in order to not have to guide the entire heating gas stream through the main supply line and/or the main discharge line in one single flow direction.

Provision may be made for each circulatory air module and/or each treatment chamber section to comprise an inlet valve and/or an outlet valve, by means of which a volumetric flow of a heating gas stream to be supplied to the circulatory air module and/or to the treatment chamber section and/or a volumetric flow of a gas stream removed from the circulatory air module and/or from the treatment chamber section is controllable and/or regulatable.

As a result, a supply air stream and/or an exhaust air stream of the circulatory air stream guided in the respective circulatory air module and/or treatment chamber section are preferably controllable and/or regulatable.

The treatment installation preferably comprises a control device, by means of which the volumetric flow of the heating gas stream to be supplied to the circulatory air module and/or treatment chamber section, and/or the volumetric flow of the gas stream removed from the circulatory air module and/or from the treatment chamber section is controllable and/or regulatable.

Preferably, by means of the control device, so much heating gas is always suppliable to the respective circulatory air module and/or treatment chamber section by controlling the volumetric flows that a desired temperature of the circulatory air stream guided in the respective circulatory air module and/or treatment chamber section is substantially constant.

The control device is preferably configured and set up such that the described functions are executable and/or that the described parameters are maintained, in particular are held at least approximately constant.

It may be favorable if the treatment installation comprises a control device by means of which an at least approximately constant volumetric flow of the heating gas stream guided in the heating gas conduit is maintainable. In particular, provision may hereby be made for a blower of the heating gas conduit which drives the heating gas stream to be controlled and/or regulated, for example by varying a drive power.

The blower (or also called fan) for driving the heating gas stream preferably comprises a frequency converter, by means of which the control or regulation may occur.

Fluctuations in the total energy requirement of the treatment installation, in particular fluctuations in the heating requirement, may preferably be compensated by controlling and/or regulating the blower of the heating gas conduit.

Alternatively or in addition hereto, a desired value and/or an actual value for a temperature of the heating gas stream may be adapted, in particular if in the case of low heating requirement, a low volumetric flow of the heating gas stream was set, for example the volumetric flow was reduced to a minimum.

Provision may further be made for the temperature of the heating gas stream to first be reduced in the case of reduced heating requirement. Upon reaching a specified bottom threshold value of the temperature of the heating gas stream, provision may then further be made for the volumetric flow to be reduced by appropriately controlling and/or regulating the blower.

Provision may be made for the treatment installation to comprise a control device, by means of which an at least approximately constant temperature of the heating gas stream guided in the heating gas conduit is maintainable. In particular, provision may hereby be made for a bypass volumetric flow, guided past a heat exchanger for heating the heating gas stream, to be influenced, in particular specifically varied. For example, a ratio of the volumetric flow, guided through the heat exchanger for heating the heating gas stream, to the bypass volumetric flow may be varied in order to achieve the desired temperature of the heating gas stream guided in the heating gas conduit.

In an embodiment of the invention, provision may be made for the heating gas conduit to comprise one or more bypass lines for circumventing all circulatory air modules and/or treatment chamber sections. In this way, a reserve of the heating gas stream may be provided, in particular in order to prevent an undesired undersupply of individual circulatory air modules and/or treatment chamber sections. In particular a surplus of heating gas in the main supply line of the heating gas conduit may be maintained by means of the bypass line.

The main supply line preferably opens into the bypass line at a downstream end thereof and/or at a rear end thereof, with respect to the conveying direction.

The bypass line preferably opens into the main discharge line at an upstream end of the main discharge line and/or at a rear end thereof, with respect to the conveying direction.

A bypass line is arranged for example upstream of multiple, in particular all, branchings and/or bifurcations of the heating gas conduit for supplying heating gas to the circulatory air modules. Alternatively or in addition hereto, provision may be made for a bypass line to be arranged downstream of multiple, in particular all, junctions of the heating gas conduit for combining gas streams from the circulatory air modules.

It may further be favorable if a bypass line is arranged downstream of multiple, in particular all, branchings and/or bifurcations of the heating gas conduit for supplying heating gas to the circulatory air modules. Alternatively or in addition hereto, provision may be made for a bypass line to be arranged upstream of multiple, in particular all, branchings of the heating gas conduit for combining gas streams from the circulatory air modules.

By means of a bypass line, hot gas may preferably be introduced directly into a removal section of the heating gas line, in particular in order to keep a temperature of the gas stream guided in the removal section always above a condensation temperature.

The bypass line preferably branches off at a front end of a supply section of the heating gas line, with respect to the conveying direction, out of the supply section of the heating gas line.

The bypass line preferably opens into the removal section of the heating gas line at a downstream end of the main discharge line and/or at a front end thereof, with respect to the conveying direction.

A volumetric flow of the heating gas stream guided via the bypass line past the circulatory air conduits is preferably controllable and/or regulatable by means of a bypass valve.

In a further embodiment of the invention, provision may be made for a pressure in the main supply line of the heating gas conduit to be determinable by means of a pressure sensor. In particular, a heating gas requirement may be determined therefrom.

Depending on a determined pressure in the main supply line, a conveying power, in particular a fan speed, of a blower for driving the heating gas stream is preferably controllable and/or regulatable by means of a control device, in particular in such a way that the pressure in the main supply line is always above a specified pressure range. As a result, a reliable heat supply to the circulatory air conduits may preferably be ensured, without having to provide a surplus and guide it via the bypass line past the circulatory air conduits.

Alternatively or in addition hereto, provision may be made for the respective positions of the inlet valves and/or the outlet values to be determinable by means of a sensor device and/or by suitable feedback, and to be able to be considered when controlling and/or regulating the conveying power, in particular the fan speed, of the blower for driving the heating gas stream.

Further, alternatively or in addition hereto, provision may be made for the respective temperatures of the gas streams in the circulatory air conduits, in particular immediately downstream of the inlet valves, in or at the inlet valves and/or in or at the outlet valves, to be determinable by means of a sensor device, and able to be considered when controlling and/or regulating the conveying power, in particular the fan speed, of the blower for driving the heating gas stream.

By controlling and/or regulating the conveying power, in particular the fan speed, of the blower for driving the heating gas stream, a particularly efficient and/or energy-saving operation of the treatment installation is preferably possible. In addition, an oversupply or undersupply of the circulatory air conduits with heating gas may preferably be avoided, even without a bypass line.

The present invention relates further to a method for treating workpieces.

The object underlying the invention in this regard is to provide a method by means of which workpieces are treatable in a simple and energy-efficient manner.

This object is achieved in accordance with the invention by a method which comprises the following:

multiple gas streams, guided in separate circuits, flowing through multiple treatment chamber sections of a treatment chamber of a treatment installation;

heating the gas streams by means of a heating gas stream which is guided in a heating gas conduit of a heating installation of the treatment installation.

The method in accordance with the invention preferably has individual or multiple features and/or advantages described in conjunction with the treatment installation.

The treatment installation preferably further has individual or multiple features and/or advantages which are described in conjunction with the method.

In the method in accordance with the invention, provision may preferably be made, for the purpose of heating the multiple gas streams guided in the separate circuits, for a partial stream of each one of the gas streams to be removed from the respective gas stream and replaced by a partial stream of the heating gas stream.

A "valve" is to be understood in this description and the accompanying claims in particular as any kind of closure element or opening element for influencing a flow rate in a line. In particular, a valve may be a flap.

It may be favorable if the circulatory air modules each comprise or form a circulatory air conduit. Provision may also be made, however, for a circulatory air module to merely be a part of a circulatory air conduit, namely that part which serves to drive the gas stream guided in the circulatory air conduit. The further part is then in particular the corresponding treatment chamber section.

Each circulatory air module preferably comprises at least one blower and a suction chamber arranged immediately upstream of the blower.

A supply channel, via which heating gas from a heating gas line of the heating gas conduit, in particular of a main supply line, is suppliable to the circulatory air module, preferably opens into the suction chamber. In this way, the heating gas is preferably able to be suctioned out of the heating gas line by means of the at least one blower of the circulatory air module.

A main supply line for distributing the heating gas to the circulatory air module preferably extends in parallel to a conveying direction of a conveying device of the treatment installation and/or over at least approximately an entire length of the treatment chamber.

The main supply line is preferably arranged outside a housing, whose interior forms the treatment chamber.

Provision may further be made for the heating installation to comprise a main discharge line, which extends in parallel to the conveying direction of a conveying device of the treatment installation and/or over at least approximately an entire length of the treatment chamber.

The main discharge line preferably serves to remove gas streams from the circulatory air modules and/or treatment chamber sections.

The main discharge line is preferably arranged within a housing surrounding the treatment chamber, in particular by dividing or separating a part of the interior of the housing.

At least one outlet valve of each one circulatory air module or each one treatment chamber section is preferably arranged in a dividing wall for removing a gas stream from the gas stream guided in the circulatory air module and/or the treatment chamber section, which dividing wall subdivides an interior of the housing into the treatment chamber and the main discharge line.

In an embodiment of the treatment installation, a transverse conveyance of the workpieces, in particular the vehicle bodies, is preferably provided. A vehicle longitudinal axis of the vehicle bodies is hereby preferably oriented horizontally and perpendicularly to the conveying direction of the conveying device.

It may be favorable if a main flow direction of the gas stream guided through a treatment chamber section is at least approximately parallel to a vehicle longitudinal axis of the conveyed vehicle bodies. In particular, provision may be made for the main flow direction to be oriented substantially in parallel to the vehicle longitudinal axis, in such a way that the vehicle body is flowed around from front to back by the gas stream. Provision may also be made, however, for the vehicle body to be flowed around from back to front by the gas stream.

Provision may further also be made for a longitudinal conveyance to be provided in the treatment installation, in which the vehicle longitudinal axis is oriented in parallel to the conveying direction of the conveying device.

It may be favorable if the treatment installation comprises a main treatment installation and a pretreatment installation.

Favorably, the treatment installation and the treatment installation each comprise a separate heating gas conduit.

A treatment installation, which comprises a main treatment installation as well as a pretreatment installation, preferably comprises two mutually independent, self-contained heating gas conduits, which in particular are thermally coupled to a common heating device.

The main treatment installation preferably comprises a heat exchanger for thermally coupling the main treatment installation to an exhaust gas discharge line of the heating device.

Further, the pretreatment installation preferably comprises a heat exchanger for thermally coupling the pretreatment installation to the exhaust gas discharge line of the heating device.

It may be favorable if the fresh gas supply for supplying fresh gas to a treatment chamber of the main treatment installation and/or to a treatment chamber of the pretreatment installation to comprise a heat exchanger, by means of which the fresh gas supply is thermally coupled to the exhaust gas discharge line of the heating device.

The one or more heat exchangers are preferably arranged at or in the exhaust gas discharge line.

The heat exchanger of the fresh gas supply is preferably arranged downstream or upstream of a heat exchanger of the main treatment installation and/or upstream or downstream of a heat exchanger of the pretreatment installation, with respect to a flow direction of the exhaust gas in the exhaust gas discharge line.

A heat exchanger of the main treatment installation is preferably arranged upstream or downstream of a heat exchanger of the pretreatment installation, with respect to a flow direction of the exhaust gas in the exhaust gas discharge line.

In a preferred embodiment, provision is made for the heat exchanger to be coupled to the exhaust gas discharge line of the heating device in such a way that the exhaust gas removed from the heating device is supplied or suppliable first to the heat exchanger of the main treatment installation, then to the heat exchanger of the pretreatment installation, an then to the heat exchanger of the fresh gas supply.

An exhaust gas from the pretreatment installation and an exhaust gas from the main treatment installation are preferably combinable and suppliable to the heating device as a joint exhaust gas stream.

In an embodiment of the invention, provision may be made for a heat exchanger of the heating device to be of multi-stage configuration. In particular, a medium to be supplied to the heat exchanger is preferably consecutively suppliable to multiple heat transfer stages.

The heat transfer stages are preferably arranged in such a way and/or are fluidically connected to each other in such a way that a medium to be supplied to the heat exchanger flows consecutively through the heat transfer stages.

Multiple heat transfer stages of the heat exchanger are preferably arranged with respect to a flow direction of one or more media, which are to be supplied to the heat exchanger, and/or spatially successively, in particular successively in a row.

Provision may be made for multiple heat transfer stages of the heat exchanger to be arranged spatially successively in a direction, and for a medium, in particular a first medium, to be able to consecutively flow therethrough in this direction.

Further, the heat transfer stages are preferably fluidically connected to each other in such a way that a second medium to be supplied to the heat exchanger flows through the heat transfer stages in a flow-through sequence which differs from a flow-through sequence of the first medium and/or from a flow-through sequence opposed to the flow-through sequence of the first medium.

It may be favorable if multiple heat exchangers jointly form a heat exchanger device. The heat exchangers are then in particular heat transfer sections of the heat exchanger device which are spatially separated from each other and/or spatially adjoin each other.

Each heat exchanger and/or each heat transfer section preferably each comprises multiple heat transfer stages.

The heat transfer sections, in particular all heat transfer stages of all heat transfer sections, are preferably arranged spatially successively in a row and/or a medium is apply to flow serially consecutively therethrough.

In particular, provision may be made for a hot gas forming a heat source to be able to flow consecutively through the heat transfer stages of all heat transfer sections. The hot gas is in particular an exhaust gas from a heating device, in particular from a thermal exhaust gas cleaning device and/or multiple gas turbine devices.

Multiple media, in particular cold gases, which form a heat sink, are preferably provided, which are to be heating by heat transfer from the hot gas.

It may be favorable if a cold gas to be heated is associated with each heat exchanger and/or each heat transfer section. Each cold gas is preferably heatable exclusively with in each case a separate heat exchanger and/or heat transfer section.

A cold gas may for example be a heating gas, in particular crude gas, circulatory air, etc.

Furthermore, a cold gas, in particular a further cold gas, may be fresh air.

In an embodiment of the invention, provision may be made for the hot gas, on the one hand, and a cold gas, for example fresh air, on the other, to be able to flow through a heat exchanger and/or a heat transfer section in such a way that the hot gas and the cold gas flow through the heat transfer section in countercurrent, in particular with respect to a flow-through sequence of multiple heat transfer stages.

Alternatively or in addition hereto, provision may be made for the hot gas, on the one hand, and a cold gas, on the other, to be able to flow through a heat exchanger and/or a heat transfer section in such a way that the cold gas flows alternatingly though one or more hotter and one or more colder heat transfer stages with respect to the respective previous heat transfer stage. The hotter and colder heat transfer stages thereby arise due to different positions of the heat transfer stages along a flow path of the hot gas.

A heat exchanger and/or a heat exchanger device preferably comprises one or more tube bundle heat exchangers, in particular combination tube bundle heat exchangers, or is formed therefrom.

The heat exchanger and/or the heat exchanger device preferably comprises multiple hollow-cylindrical tubes running parallel to each other for guiding hot gas. In particular cold gas is able to flow around the tubes in order to transfer heat from hot gas to the cold gas.

It may be favorable if a chamber surrounding the hollow-cylindrical tubes is divided by means of multiple dividing elements into multiple mutually separated heat transfer regions. Cold gas may hereby be specifically brought into contact with the tubes at different positions along a longitudinal extension direction of the tubes, in particular in order to enable a heat transfer with different starting temperatures (temperature of the hot gas and/or of the tube in the respective heat transfer region). An overheating of the cold gas may preferably hereby be avoided in order to ultimately avoid undesired processes in the cold gas, in particular cracking processes or other chemically and/or thermally contingent transformations.

The dividing elements are in particular dividing plates which have openings for guiding and/or accommodating the hollow-cylindrical tubes. The openings are preferably formed complementary to the hollow-cylindrical tubes, in particular in such a way that the dividing plates are slidable onto the hollow-cylindrical tubes in an as precisely fitting a manner as possible.

The heat transfer regions define and/or are in particular the heat transfer stages.

The hollow-cylindrical tubes of the tube bundle heat exchanger preferably extend across multiple, in particular all, heat transfer sections for mutually different cold gases.

It may be favorable if the hollow-cylindrical tubes of the tube bundle heat exchanger extend across multiple, in particular all, heat transfer stages of multiple, in particular all, heat transfer sections.

For example, provision may be made for the hot gas to guidable through all heat transfer stages of all heat transfer sections, exclusively by means of entirely continuous tubes.

The heat transfer regions are in particular fluidically connected to each other by means of a connecting gas conduit, preferably in such a way that the cold gas is guidable consecutively through multiple heat transfer regions.

The dividing elements preferably prevent or minimize a crossing of gas between individual heat transfer regions along the longitudinal extension direction of the tubes.

It may be favorable if a pressure drop between adjacent heat transfer regions is producible and/or maintainable by means of a pressure control and/or pressure regulator, for example by using an adapted control device for controlling and/or regulating fans and/or blowers.

The pressure drop between adjacent heat transfer regions is preferably producible and/or maintainable in such a way that colder cold gas with lower risk of condensation flows out of a heat transfer region through a dividing element to an adjacent heat transfer region in which comparatively hotter cold gas with higher risk of condensation is arranged. The cold gases are thereby in particular mutually different cold gases.

A cold gas with lower risk of condensation is in particular fresh air and/or air from a predrier A cold gas with higher risk of condensation is in particular air from a main drier.

The term "risk of condensation" is to be understood in this description and the accompanying claims to mean a tendency of the gas to partially condense when cooling off from the respective present temperature.

In particular, the risk of condensation is the danger that gaseous solvents condense out of the cold gas upon contact and/or mixing of the cold gas with gas from an adjacent heat transfer region.

In an embodiment of the invention, provision may be made for two heat transfer regions to be separated from each other by means of two dividing elements, wherein a gap region is formed between the two dividing elements, to which gap region preferably sealing air, in particular fresh air, is suppliable. In particular a mixing and/or a crossing of gas between the two heat transfer regions may hereby be prevented and/or minimized.

Alternatively or in addition to warming heating gas by means of one or more heat exchangers, a direct heating may be provided.

Provision may thereby be made, for example, for hot exhaust gas to be produced by means of a gas burner and/or a gas turbine, in particular a micro gas turbine, which hot exhaust gas is supplied to the heating gas conduit as the heating gas stream or as a constituent part of the heating gas stream. In addition, in particular an exhaust gas purification may be provided upstream of the treatment chamber, for example in order to minimize a pollution (in particular NOx and CO) or any other undesired exposure of the treatment chamber to constituents of the exhaust gas initially produced.

It may be favorable if for one or more circulatory air modules and/or circulatory air conduits, a direct heating is provided. In particular, this may be advantageous for a predrier, which connects to a cathodic dip-painting installation, for example. As a result, an optimized paint hardening may be obtained under certain circumstances.

For such a direct heating, exhaust gas from a micro gas turbine, for example, may be used.

It may be advantageous if the following gas streams are supplied to the heating gas stream, or if the heating gas stream is formed by the following gas streams:

a) exhaust gas from a burner device, for example one or more micro gas turbines or a gas burner, by means of which in particular a base load is covered;
b) exhaust gas from a supplementary burner, in particular a modulating and/or modulatable blower burner, for example a so-called LowNOx-burner, by means of which load changes and/or load peaks are compensated;
c) purge gas, in particular purge air, which, in particular for reasons of safety and cooling, is guided through a housing of the burner device, in particular of the one or more micro gas turbines. Said purge gas has in particular a temperature between about 40° C. and about 80° C.

Such a heating gas stream may in particular be used for heating a predrier.

Alternatively or in addition, an indirect heating may be provided for one or more circulatory air modules and/or circulatory air conduits. In particular, this may be beneficial for a main drier which connects to a cathodic dip-painting installation, for example.

For such an indirect heating, a heat exchanger may be used, for example.

In an embodiment of the invention, provision may be made for the heating gas conduit to comprise an exhaust gas blower, which releases in particular excess heating gas, which was not needed in the circulatory air modules and/or circulatory air conduits or was guided past them, into a vicinity of the treatment installation, in particular into the atmosphere.

Further, the exhaust air blower may preferably ensure a desired exhaust air volumetric flow and/or exhaust air mass flow out of the predrier, so that a volumetric flow of the heating gas stream supplied for example under direct heating, on the one hand, and a volumetric flow and/or mass flow of the removed exhaust air, on the other, are balanced. For this purpose, two or more volumetric flow probes, in particular standard volumetric flow probes, may be used, for example, wherein a volumetric flow probe registers a volumetric flow and/or mass flow of a total supplied heating gas stream, and/or wherein a volumetric flow probe registers and/or determines the sum of the volumetric flow and/or mass flow of the excess heating gas stream and of the volumetric flow and/or mass flow of the exhaust air removed from the treatment chamber. The exhaust air blower is preferably regulated in such a way that the supplied volumetric flow and/or mass flow corresponds to the removed volumetric flow and/or mass flow.

In an embodiment of the invention, provision may be made for an injector device to be provided alternatively or in addition to a blower of a respective circulatory air module and/or of a respective circulatory air conduit.

It may be favorable if one or more circulatory air modules and/or one or more circulatory air conduits each comprise one or more injector devices.

An injector device preferably comprises an injector nozzle, by means of which a gas stream is introducible into the treatment chamber. The injector nozzle thereby enables in particular the supply of the gas stream to the treatment chamber in accordance with the injector principle.

The gas stream is preferably air, in particular overheated air. For example, the gas stream is the heating gas stream.

The gas stream is preferably introducible into the treatment chamber by means of the injector nozzle with a flow rate of at least about 10 m/s, preferably at least about 15 m/s, for example about 20 m/s.

The gas stream is preferably introducible into the treatment chamber by means of the injector nozzle with a flow rate of at most about 40 m/s, preferably at most about 30 m/s, for example about 25 m/s.

Provision may further be made for the gas stream to be introducible into the treatment chamber by means of the injector nozzle as a beam having a beam diameter of at most about 200 mm, preferably at most about 150 mm, for example about 100 mm.

Provision may further be made for the gas stream to be introducible into the treatment chamber by means of the injector nozzle as a beam having a beam diameter of at least about 10 mm, preferably at least about 50 mm, for example about 80 mm.

The gas stream is preferably introducible into the treatment chamber by means of the injector nozzle with a temperature of at least about 150° C., preferably at least about 200° C., for example at least about 250° C.

Provision may further be made for the gas stream to be introducible into the treatment chamber with a temperature of at most about 500° C., preferably at most about 450° C., for example at most about 400° C.

A gas stream supplied to the treatment chamber by means of an injector nozzle is in particular directed or directable at the workpieces and/or into an interior of the workpieces to be treated.

Further preferred features and/or advantages of the invention are subject matter of the subsequent description and the graphic illustration of exemplary embodiments.

BRIEF DESCRIPTION OF THE DRAWINGS

The same or functionally elements are provided with the same reference numerals in all figures.

DETAILED DESCRIPTION OF THE DRAWINGS

Figure 1:
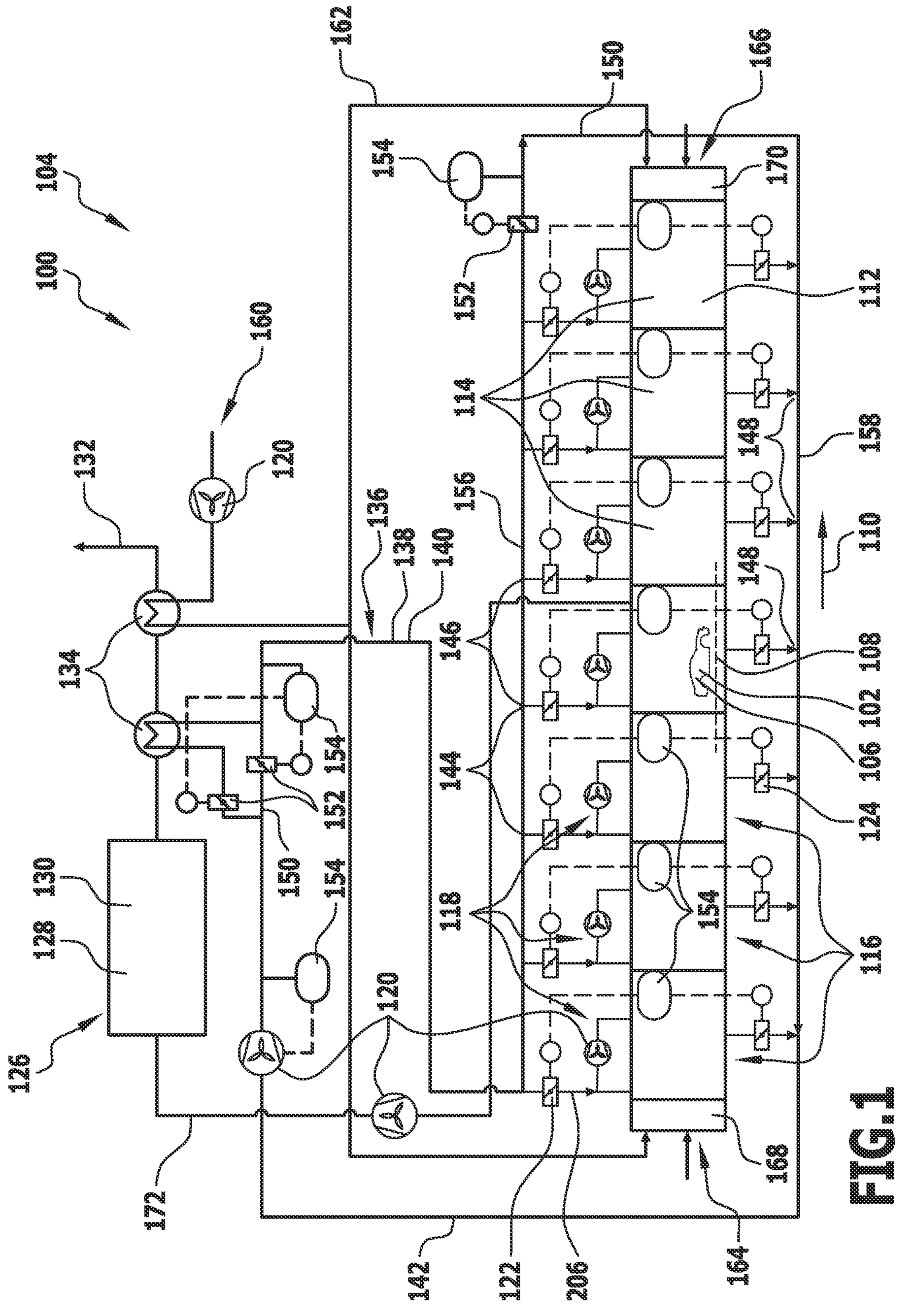
FIG. 1 shows a schematic depiction of a first embodiment of a treatment installation in which a self-contained heating gas conduit and a fresh gas supply independent therefrom are provided.

A first embodiment schematically depicted in FIG. 1 of a treatment installation designated as a whole with 100 serves to treat workpieces 102.

The treatment installation 100 is, for example, a drying installation 104 for drying workpieces 102.

The workpieces 102 are vehicle bodies 106, for example.

The treatment installation 100 preferably serves to dry previously painted or otherwise treated vehicle bodies 106.

The workpieces 102 are conveyable by means of a conveying device 108 of the treatment installation 100 along a conveying direction 110 through a treatment chamber 112 of the treatment installation 100.

The treatment chamber 112 comprises multiple, for example at least four, in particular at least six, preferably exactly seven, treatment chamber sections 114 or is formed by these treatment chamber sections 114.

A separate circulatory air module 116 is preferably associated with each treatment chamber section 114.

By means of each one circulatory air module 116, a gas stream is preferably guidable in a circuit, in particular a circulatory air conduit 118, and guidable through the respective treatment chamber section 114. In each case one circulatory air module 116 and in each case one treatment chamber section 114 preferably form a circulatory air conduit 118.

Each circulatory air module 116 preferably comprises one or more blowers 120 for driving the gas stream guided in the circuit.

Each circulatory air module 116 and/or each treatment chamber section 114 preferably further comprises an inlet valve 122 and an outlet valve 124.

By means of the inlet valve 122, a gas stream serving as a supply air stream may preferably be guided to the gas stream guided in the circulatory air conduit 118.

By means of the outlet valve 124, a portion of the gas stream guided in the circulatory air conduit 118 may preferably be removed.

By means of the inlet valve 122 and the outlet valve 124, an exchange of the gas stream guided in the circulatory air conduit 118 may thus be carried out. Said exchange of the gas stream guided in the circulatory air conduit 118 serves in particular to control and/or regulate certain parameters of the gas stream guided in the circulatory air conduit 118. In particular, a temperature of the gas stream guided in the circulatory air conduit 118 may hereby be controlled and/or regulated.

Provision may be made in particular for the gas stream guided in the circulatory air conduit 118 to be heatable by supplying heating gas. This heat input then serves to heat the workpiece 102 to be treated, in particular to dry a workpiece 102 in the form of a vehicle body 106.

The gas to be supplied to each one circulatory air conduit 118 is preferably a heating gas which is providable by means of a heating installation 126 of the treatment installation 100.

The heating installation 126 preferably comprises a heating device 128, which is in the form of a thermal exhaust gas purification device 130, for example.

By means of the heating device 128, a hot exhaust gas is preferably producible, which is removable from the heating device 128 via an exhaust gas discharge line 132.

The heating installation 126 preferably further comprises a heat exchanger 134, which is thermally coupled to the exhaust gas discharge line 132, in order to use the heat of the exhaust gas to heat a further medium.

Said further medium is, for example, a heating gas which is guided or guidable in a closed heating gas conduit 136.

The heating gas conduit 136 is in particular a circulatory air conduit in which at least a majority of the heating gas guided therein is guided or guidable in a circuit.

The heating gas conduit 136 preferably comprises a heating gas line 138 and one or more blowers 120 for driving the heating gas guided in the heating gas line 138.

By means of a heat exchanger 134 of the heating installation 126, the exhaust gas discharge line 132 of the heating device 128 is preferably thermally coupled to the heating gas line 138.

The heating gas line 138 preferably comprises a supply section 140 which connects the heat exchanger 134 to the circulatory air modules 116 and/or the treatment chamber sections 114.

In particular a heated heating gas is suppliable to the circulatory air conduits 118 and thus to the treatment chamber section 114 via the supply section 140 of the heating gas line 138.

The heating gas line 138 further comprises a removal section 142 by means of which gas removed from the circulatory air conduits 118 is removable and suppliable to the heat exchanger 134 for the reheating thereof.

The supply section 140 of the heating gas line 138 preferably comprises multiple branchings 144 or bifurcations 146 in order to distribute a heating gas total stream to the individual circulatory air modules 116 and/or treatment chamber sections 114.

The removal section 142 preferably comprises multiple junctions 148 in order to be able to combine the individual (partial) gas stream removed from the circulatory air conduits 118 and resupply them to the heat exchanger 134 as a joint gas stream.

The heating gas conduit 136 preferably also further comprises a bypass line 150 by means of which a partial gas stream of the heating gas total stream supplied to the circulatory air conduits 118 by the supply section 140 of the heating gas line 138 is guidable past all circulatory air modules 116 and/or treatment chamber sections 114 and suppliable directly to the removal section 142.

By using such a bypass line 150, a surplus of heating gas may preferably be provided before the circulatory air conduits 118 in order to always have a sufficient amount of heating gas available, even in the case of fluctuating heating gas requirement in the circulatory air conduits 118.

A volumetric flow of the heating gas stream guided past the circulatory air conduits 118 via the bypass line 150 is preferably controllable and/or regulatable by means of a bypass valve 152.

The heating gas conduit 136 preferably comprises one or more control devices 154 for controlling and/or regulating the blowers 120 and/or the inlet valves 122 and/or the outlet valves 124 and/or the bypass valve 152 of the bypass line 150.

By means of the one or more control devices 154, in particular a distribution of the heating gas stream to the circulatory air conduits 118 is thus controllable and/or regulatable.

Further, a total volumetric flow and/or a temperature of the heating gas stream is controllable and/or regulatable by means of the one or more control devices 154.

The heating gas conduit 136 may still further comprise a bypass line 150 in the region of the heat exchanger 134. By means of said bypass line 150 and by means of a bypass valve 152 associated with this bypass line 150, it is preferably controllable and/or regulatable which partial volumetric flow of the heating gas total stream is guided through the heat exchanger 134 or guided past this for heating said heating gas total stream. In particular, a constant temperature of the heating gas stream downstream of the heat exchanger 134 and the bypass line 150 and/or upstream of the circulatory air conduits 118 may hereby be controlled and/or regulated.

In an embodiment of the treatment installation 100, provision may be made for the heating gas line 138, in particular the supply section 140 of the heating gas line 138, to comprise a main supply line 156.

Said main supply line 156 preferably runs outside of the treatment chamber 112 in parallel to the conveying direction 110. The main supply line 156 preferably extends at least approximately over an entire length of the treatment chamber 112 in order to be able to supply all circulatory air conduits 118 with heating gas.

The heating gas line 138, in particular the removal section 142 of the heating gas line 138, preferably comprises a main discharge line 158.

The main discharge line 158 is preferably arranged outside of the treatment chamber 112 or integrated therein.

In particular, provision may be made for the main discharge line 158 to extend in parallel to the conveying direction 110 and/or at least approximately over an entire length of the treatment chamber 112. Preferably all (partial) gas streams removed from the circulatory air conduits 118 may hereby be removed.

The bypass line 150 for circumventing all circulatory air conduits 118 is preferably arranged at a rear end of the main supply line 156 and/or of the main discharge line with respect to the conveying direction 110.

The treatment installation 100 further comprises a fresh gas supply 160 for supplying fresh gas to the treatment chamber 112.

The fresh gas supply 160 preferably comprises a fresh gas line 162 and a blower 120 for driving a fresh gas stream in the fresh gas line 162.

The fresh gas supply 160 preferably further comprises a heat exchanger 134 by means of which the fresh gas line 162 and the exhaust gas discharge line 132 of the heating device 128 are thermally coupled to each other. In particular, the fresh gas supplied via the fresh gas supply 160 is hereby heatable before being supplied to the treatment chamber 112.

The fresh gas line 162 preferably opens into the treatment chamber 112 in the region of an entry section 164, in which the workpieces 102 are introduced into the treatment chamber 112, and/or in the region of an exit section 166, in which the workpieces 102 are removed from the treatment chamber 112.

In particular, an inlet airlock 168 in the region of the entry section 164 and/or an outlet airlock 170 in the region of the exit section 166 are thereby provided. Further, one or more intermediate airlocks may be provided.

The fresh gas supplied via the fresh gas supply 160 serves in particular as airlock gas, with which it is avoidable that gas guided in the circulatory air conduits 118 is released through the entry section 164 and/or the exit section 166 outwardly to a vicinity of the treatment installation 100.

The volumetric stream of the fresh gas stream is preferably selected such that, starting from the entry section 164 and/or the exit section 166, a transverse stream arises that flows along or against the conveying direction 110 and thus transversely to the gas streams guided in the circulatory air conduits 118. This leads in particular to a loading of the gas stream guided in the treatment chamber 112 with contaminants and/or other substances, for example solvent vapors, etc., increasing toward the middle of the treatment chamber 112.

An upstream end of an exhaust gas discharge 172 of the treatment installation 100 is therefore preferably provided on the treatment chamber 112 substantially in the middle with respect to the conveying direction 110.

In particular an exhaust gas stream is removable from the treatment chamber 112 via the exhaust gas discharge 172 and is preferably suppliable directly to the heating device 128.

In particular if the exhaust gas removed from the treatment chamber 112 is solvent-containing, a purification of the exhaust gas may occur by means of the heating device 128 by using energy which is contained in the exhaust gas and/or is released upon combustion.

The previously described treatment installation 100 functions as follows:

For heating and/or drying the workpieces 102, these are conveyed through the inlet airlock 168 into the treatment chamber 112 by means of the conveying device 108. In the treatment chamber 112, the workpieces 102 consecutively pass through the treatment chamber sections 114.

A gas stream guided in a circuit flows through individual, multiple, or all treatment chamber sections 114, which gas stream has a temperature which is increased with respect to the temperature of the workpiece 102, such that the workpiece 102 heat up or maintains a specified temperature due to the gas stream flowing around or at it.

The at first relatively cold workpiece 102 thereby receives the greatest amount of heat, in particular in a first treatment chamber section 114 with respect to the conveying direction 110, such that the circulatory air module 116 and/or the circulatory air conduit 118 of this first treatment chamber section 114 must yield the greatest heating output. The subsequent treatment chamber sections 114 preferably yield continuously lower heating outputs.

The respective heating output is yielded in that heating gas from the heating installation 126 is supplied to the respective circulatory air module 116 and/or the respective treatment chamber section 114.

Said heating gas has an increased temperature compared to gas stream guided in the circulatory air conduit 118 in order to ultimately heat the entire gas stream guided in the circulatory air conduit 118 and thus also the workpiece 102.

The heating gas is provided in that it is heated by means of a heat exchanger 134 by using hot exhaust gas from the heating device 128.

For example, provision may hereby be made for the heating gas to be heated to a temperature of at least about 200° C., preferably at least about 250° C., for example about 270° C.

To compensate the heating gas volumetric flow supplied to each one circulatory air conduit 118, a corresponding partial gas volumetric flow of the gas stream guided in the circulatory air conduit 118 is preferably removed from the circulatory air conduit 118.

Said removed gas streams from all circulatory air conduits 118 are combined and supplied to the heat exchanger 134 for rewarming and thus for providing heated heating gas.

In particular if the workpieces 102 release health-relevant substances upon drying, an excessively high concentration thereof and an undesired release into the vicinity must be avoided. For this purpose, fresh gas is supplied to the treatment chamber 112 via the fresh gas supply 160 and gas loaded with the health relevant-substances is removed via the exhaust gas discharge 172.

The removed exhaust gas is then purified in the heating device 128, in particular by burning the substances contained therein.

Exhaust gas from the heating device 128 is then removed via the exhaust gas discharge line 132. The heat contained in said exhaust gas is used in order to heat the fresh gas supplied via the fresh gas supply 160 and/or the heating gas guided in the heating gas conduit 136.

Figure 2:
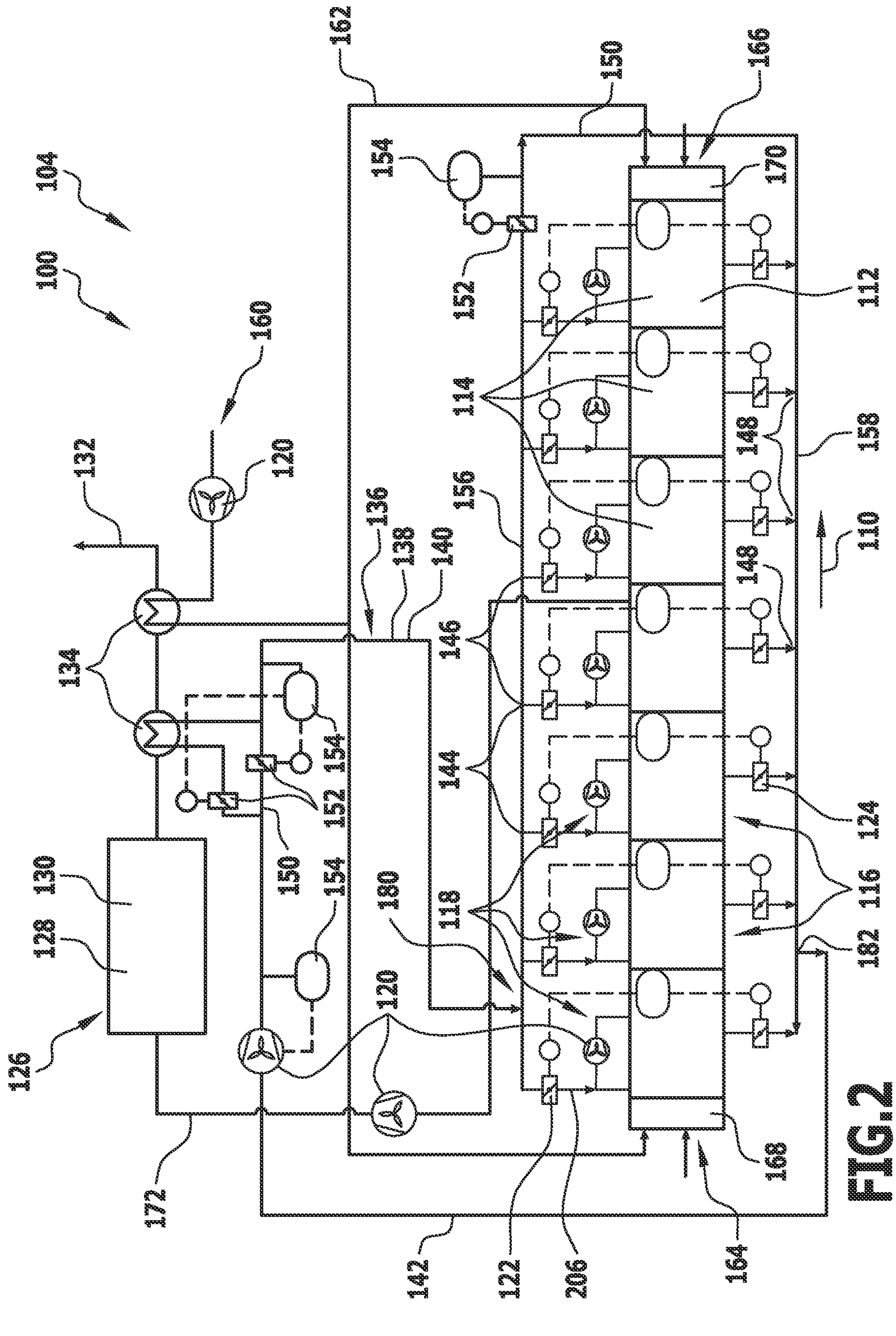
FIG. 2 shows a depiction corresponding to FIG. 1 of a second embodiment of a treatment installation in which an optimized flow guidance of the heating gas conduit is provided.

A second embodiment depicted in FIG. 2 of a treatment installation 100 differs from the first embodiment depicted in FIG. 1 substantially in that the heating gas line 138 comprises a main branching 180 and/or a main junction 182.

The main branching 180 serves in particular to, already upon being supplied to the main supply line 156, distribute the heated heating gas total stream to a first circulatory air conduit 118 with respect to the conveying direction 110, on the one side, and to all remaining circulatory air conduits 118 on the other. As a result, in particular a flow cross section of the main supply line 156 may be minimized, because not the entire heating gas stream for all circulatory air conduits 118 needs to be guided through the main supply line 156, for example along the conveying direction 110. Rather, a heating gas partial volumetric flow for the first circulatory air conduit 118, with respect to the conveying direction 110, which first circulatory air conduit 118 must yield the greatest heat output in comparison to the further circulatory air conduits 118, branches off and is supplied to said circulatory air conduit 118 against the conveying direction 110.

The main junction 182 preferably serves to combine a partial gas stream removed from the first circulatory air conduit 118, with respect to the conveying direction 110, with the partial gas streams which were removed from all other circulatory air conduits 118. As a result, a line cross section of the main supply line 158 may preferably be minimized.

In all other respects, the second embodiment depicted in FIG. 2 of the treatment installation 100 corresponds with respect to construction and function with the second embodiment depicted in FIG. 2, such that reference is made to its preceding description in that respect.

Figure 3:
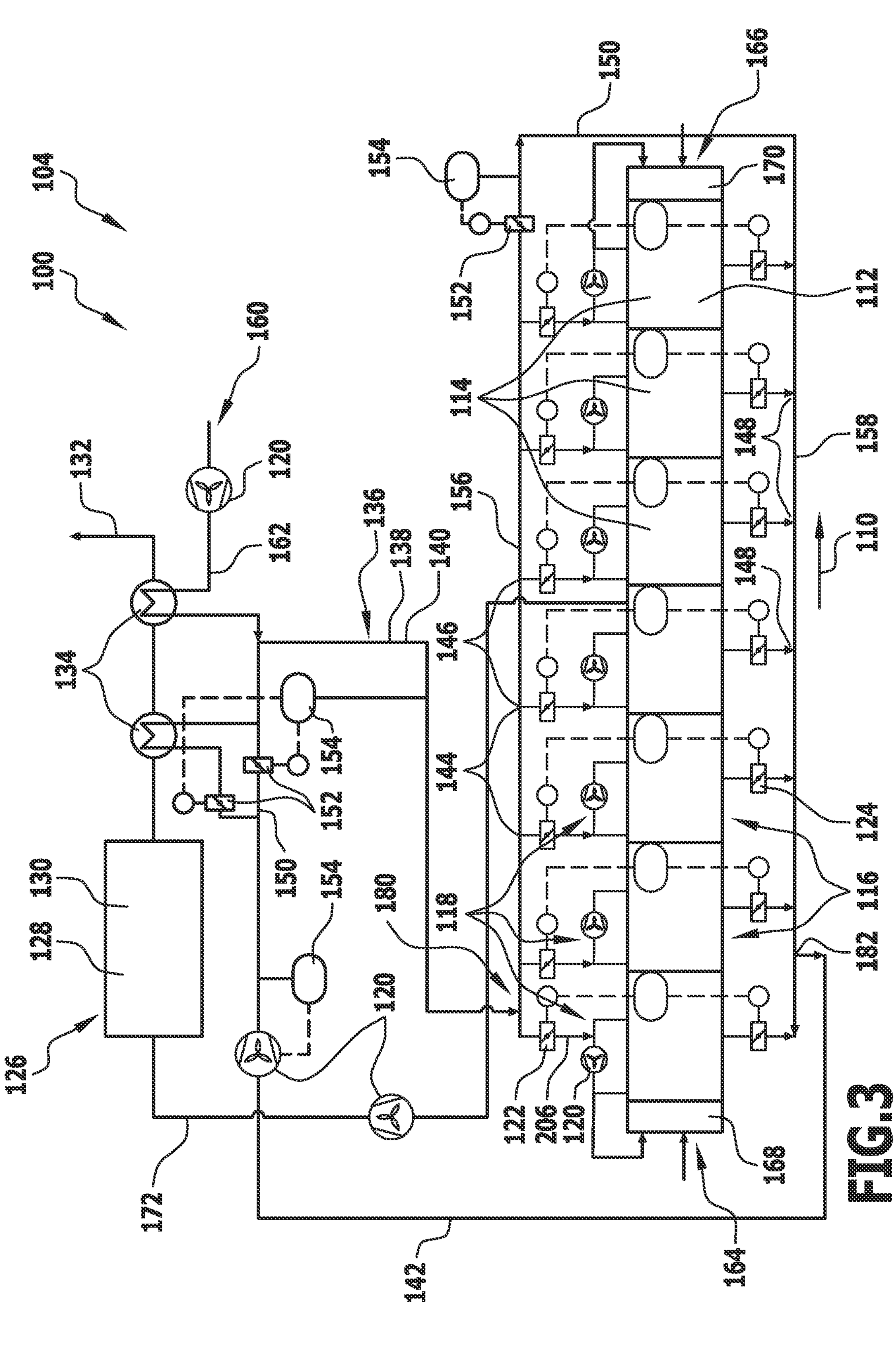
FIG. 3 shows a schematic depiction corresponding to FIG. 1 of a third embodiment of a treatment installation in which the fresh gas supply opens into the heating gas conduit.
Figure 4:
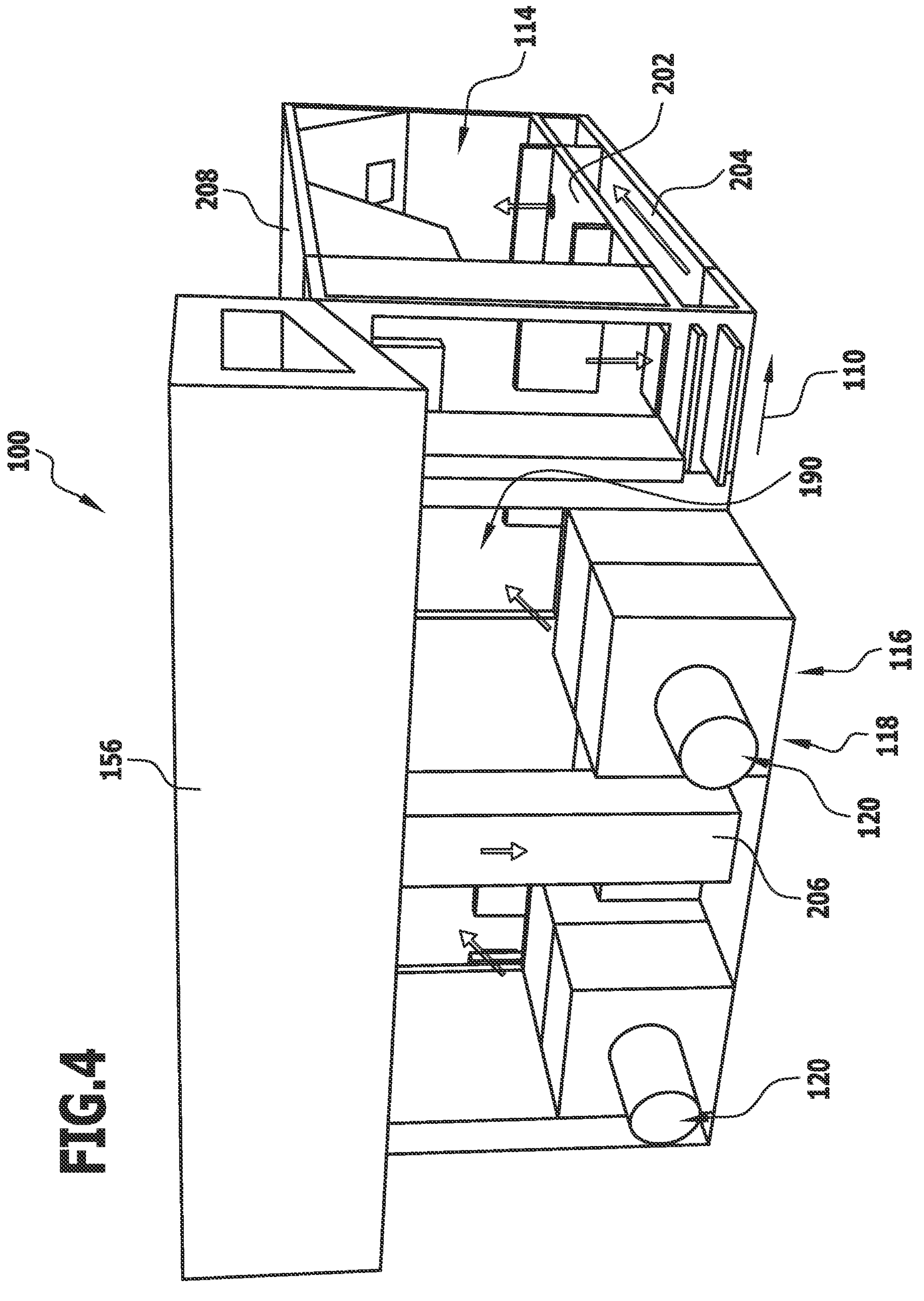
FIG. 4 shows a schematic perspective depiction of a circulatory air module of a treatment installation including a treatment chamber section of a treatment chamber of the treatment installation.

A third embodiment depicted in FIG. 3 of the treatment installation 100 differs from the second embodiment depicted in FIG. 2 substantially in that the fresh gas supply 160 opens directly into the heating gas conduit 136.

The fresh gas to be supplied to the treatment chamber 112 is, in the third embodiment depicted in FIG. 3 of the treatment installation 100, thus suppliable to the circulatory air conduits 118 and thus to the respective treatment chamber section 114 via the heating gas line 138, in particular the supply section 140 of the heating gas line 138.

Circulatory air is thereby preferably able to flow through the inlet airlock 168 and the outlet airlock 170. For this purpose, separate circulatory air modules 116 or the circulatory air modules 116 of the respectively adjacent treatment chamber section 114 are preferably associated with the inlet airlock 168 and the outlet airlock 170, respectively.

In all other respects, the third embodiment depicted in FIG. 3 corresponds with respect to construction and function with the second embodiment depicted in FIG. 2, such that reference is made to its preceding description in that respect.

In all described embodiments, provision may additionally be made for additional, in particular conditioned or unconditioned, fresh air or other fresh gas to be supplied in the entry section 164 and/or in the exit section 166, whereby an undesired outflow of gas from the treatment chamber 112 is preferably avoided.

Alternatively or in addition hereto, provision may be made for conditioned or unconditioned fresh air or other fresh gas to be supplied to the heating gas stream, in particular immediately upstream of a heat exchanger 134 for heating the heating gas stream and/or immediately upstream of a blower 120 for driving the heating gas stream in the heating gas conduit 136. Preferably, a separate fresh gas conduit 160 may hereby be reduced to a minimum or entirely avoided. In particular, separate channels, lines, and/or insulations for supplying fresh air or other fresh gas to the entry section 164 and/or the exit section 166 may be saved.

An embodiment of a circulatory air conduit 118 depicted in FIGS. 4 to 10 is an example of a circulatory air conduit 118 of a treatment installation 100 in accordance with FIG. 1, 2, 3, or 11.

The circulatory air module 116 of the circulatory air conduit 118 is thereby associated with a treatment chamber section 114 of the circulatory air conduit 118, such that a gas stream guided in a circulatory air circuit is able to flow through said treatment chamber section 114.

As may be seen in particular from FIGS. 4, 6, and 8 to 10, the circulatory air module 116 is coupled to a main supply line 156 of a treatment installation 100 in order to be able to supply the circulatory air module 116 and/or the circulatory air conduit 118, formed by the circulatory air module 116 and or the treatment chamber section 114, with heating gas.

The circulatory air module 116 comprises one or more blowers 120 for driving the gas stream in the circulatory air conduit 118.

The circulatory air conduit 118 preferably comprise the one or more blowers 120, a pressure chamber 190, the treatment chamber section 114, a return line 192, and/or a suction chamber 194.

The pressure chamber 190 is in particular arranged immediately downstream of the one or more blowers 120 and preferably serves to homogenize a gas stream, which is to be supplied to the treatment chamber section 114, and to distribute the gas stream to multiple supply openings 196 for supplying the gas stream to the treatment chamber section 114.

The gas stream introduced into the treatment chamber section 114 via the supply openings 196 is preferably partially removable via one or more return openings 198 and suppliable to the suction chamber 194 via the return line 192.

A further portion of the gas stream supplied to the treatment chamber section 114 via the supply openings 196 is preferably removable from the circulatory air conduit 118 and from the treatment chamber section 114 via discharge openings 200 and suppliable to the main discharge line 158.

The supply openings 196, the return openings 198, and/or the discharge openings 200 are preferably arranged in such a way that preferably at least a majority of the gas stream guided through the treatment chamber section 114 is supplied or suppliable on a side of the workpiece 102 and is removable or removed from the treatment chamber section 114 on a further side of the workpiece which is opposite said side. As a result, an optimized flow-through of the treatment chamber section 114 and an optimized heating of the workpiece 102 preferably arises.

Figure 5:
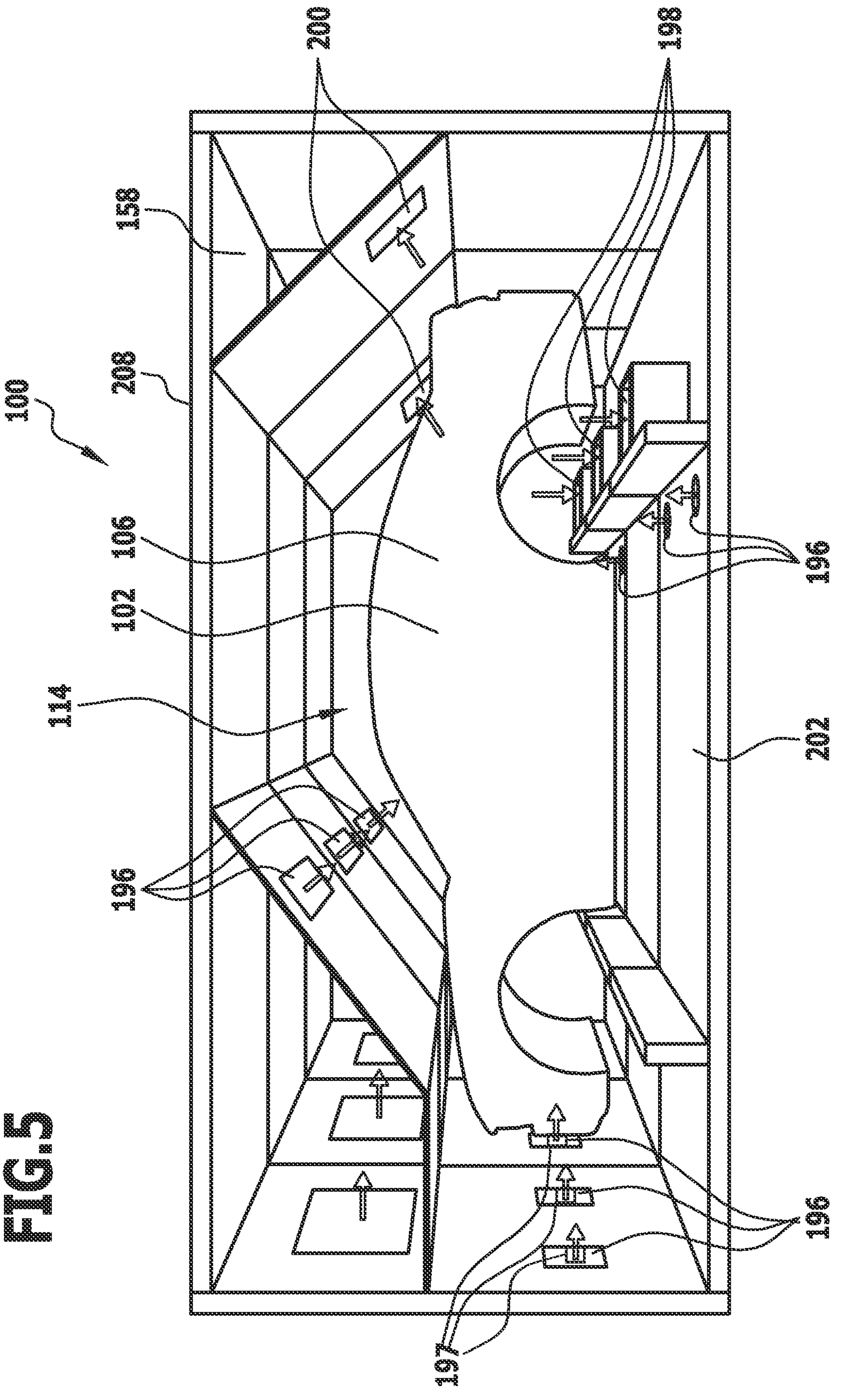
FIG. 5 shows a schematic side view of the treatment chamber section from FIG. 4.
Figure 6:
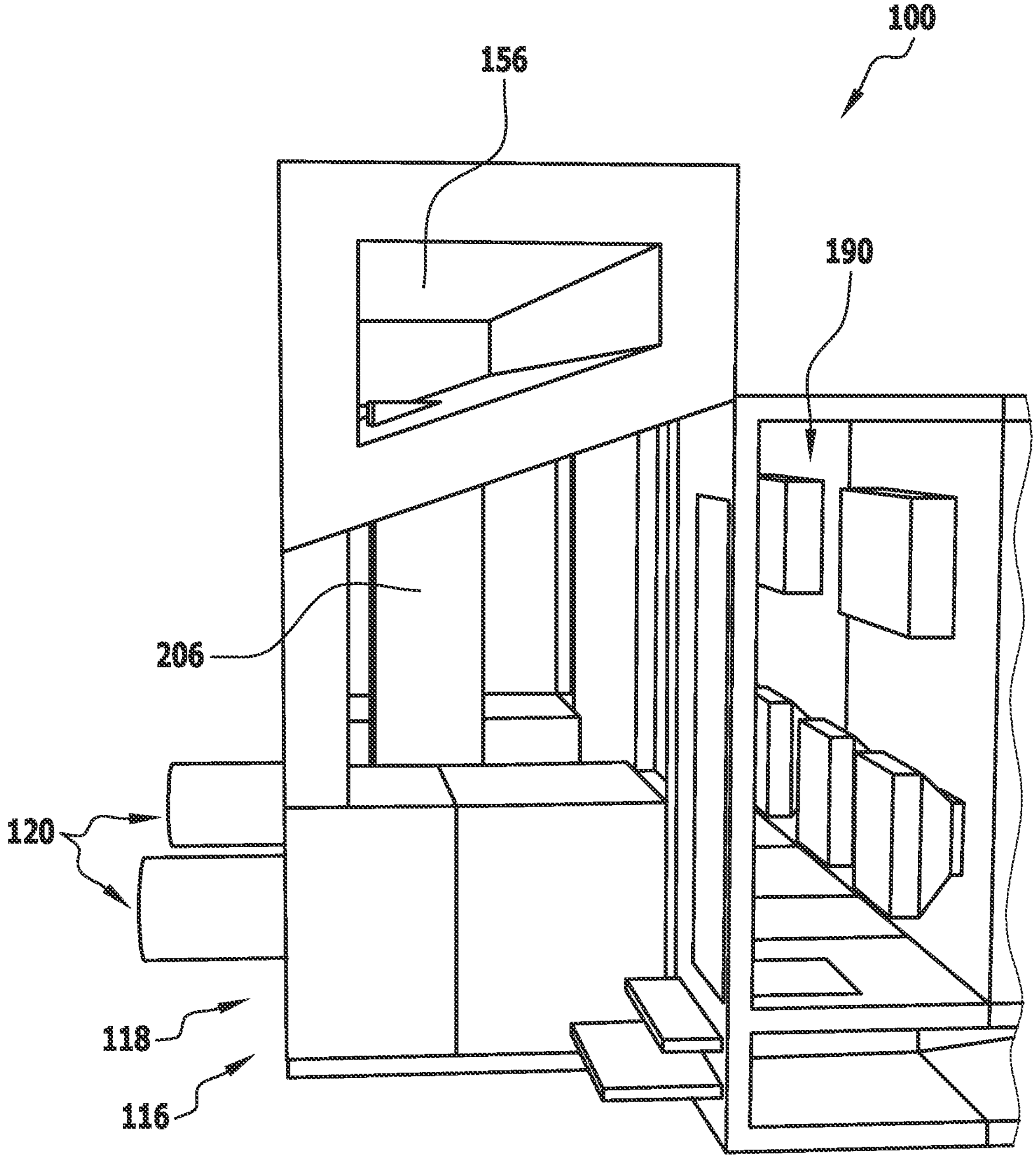
FIG. 6 shows an enlarged depiction of a section of the circulatory air module from FIG. 4.

As may be seen in particular in FIG. 5, provision may be made for further supply openings 196 to be provided in addition to the supply openings 196 preferably arranged in a side wall of the treatment chamber 114, which additional supply openings 196 are arranged in a base 202 delimiting the treatment chamber section 114 to the bottom. The workpiece 102 is preferably able to be flowed against from beneath by means of said additional supply openings 196. In some examples, the supply openings 196 include and/or are fluidly coupled to one or more injector devices 197, which are implemented as nozzles. The example nozzles 197 can be implemented for supplying a heating gas stream to the treatment chamber 114 in accordance with an injector principle, for example. In some examples, the nozzles 197 can introduce a heating gas stream with a flow rate of at least approximately 10 meters per second (m/s). Additionally or alternatively, the example nozzles 197 can have a beam diameter of at least approximately 10 mm. As may be seen in particular in FIGS. 4, 7, and 8, the supply of the gas stream to the supply openings 196 arranged in the base 202 occurs out of the pressure chamber 190 via one or more base channels 204 running beneath the base 202 or in the base 202.

For example, two such base channels 204 are provided in order to supply the gas stream to the additional supply openings 196.

Figure 7:
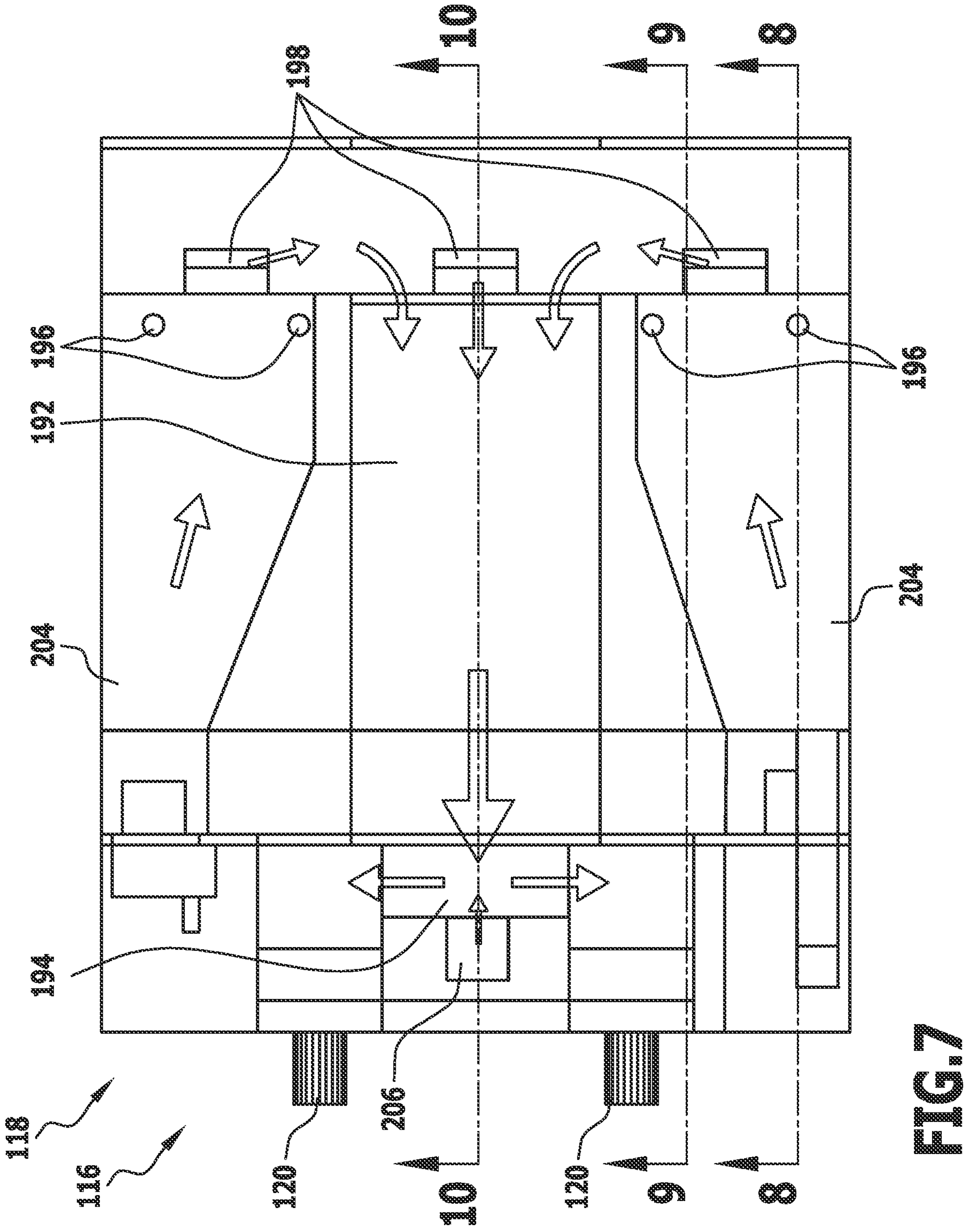
FIG. 7 shows a schematic horizontal section through an underbody construction of the circulatory air module and the treatment chamber section from FIG. 4.
Figure 8:
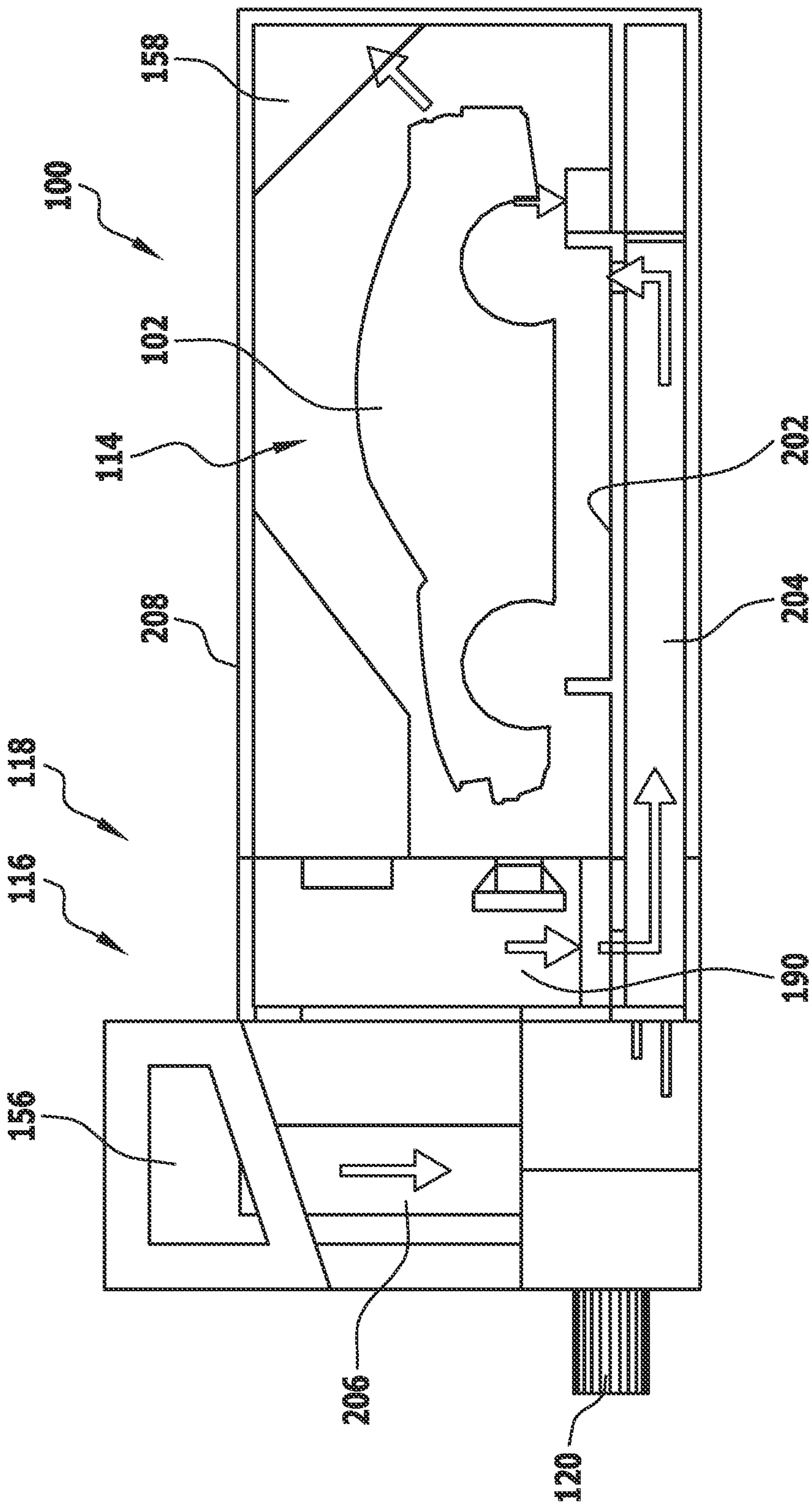
FIG. 8 shows a schematic vertical section through the circulatory air module and the treatment chamber section from FIG. 4 along the line 8-8 in FIG. 7.
Figure 9:
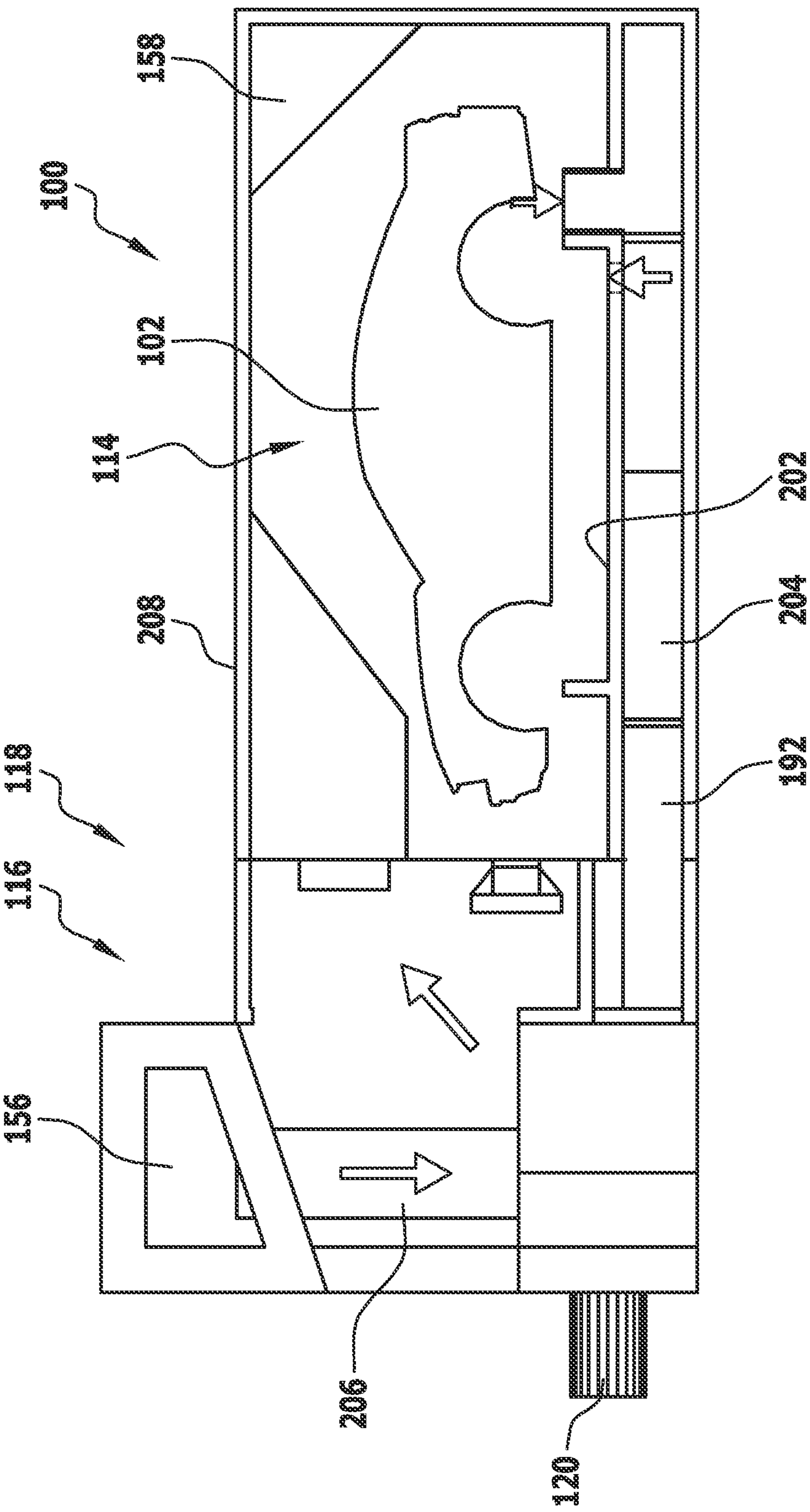
FIG. 9 shows a schematic vertical section through the circulatory air module and the treatment chamber section from FIG. 4 along the line 9-9 in FIG. 7.
Figure 10:
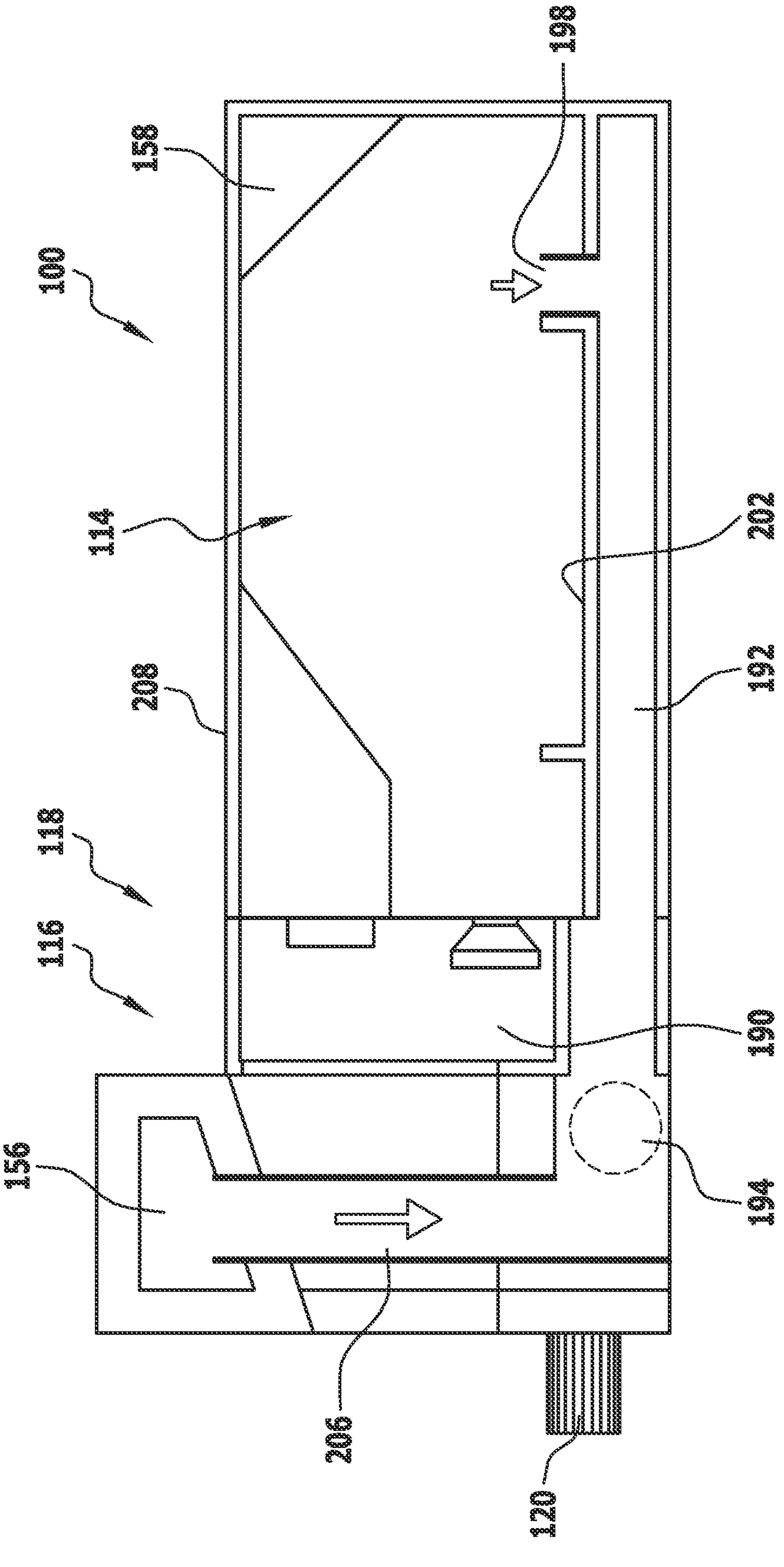
FIG. 10 shows a schematic vertical section through the circulatory air module and the treatment chamber section from FIG. 4 along the line 10-10 in FIG. 7.

Said two base channels 204 are preferably arranged on both sides of the return line 192 (see FIG. 7 in particular).

The suction chamber 194 is preferably arranged immediately upstream of the one or more blowers 120, such that gas located in the suctions chamber 194 may be drawn up via the one or more blowers 120.

The return line 192 opens into the suction chamber 194. Provision may further be made for the suction chamber 194 to be formed by an end of the return line 192 arranged downstream.

The supply of heating gas from the main supply line 156 into the circulatory air conduit 118 preferably occurs via the suction chamber 194.

For this purpose, a supply channel 206 is provided, which fluidically connects the main supply line 156 to the suction chamber 194.

A valve, in particular the inlet valve 122, is preferably arranged in the supply channel 206 or at one or both ends thereof (not shown in FIGS. 4 to 10). The amount (the volumetric flow) of the heating gas supplied to the circulatory air conduit 118 is preferably controllable and/or regulatable by means of the valve.

Therein that the supply channel 206 preferably opens into the suction chamber 194, heating gas from the main supply line 156 may be admixed to the gas stream guided in the circulatory air conduit 118 in a simple and energy-efficient manner by means of the one or more blowers 120. By subsequently flowing through the one or more blowers 120 as well as the pressure chamber 190, a uniform mixing of the supplied heating gas and the remaining gas stream guided in the circulatory air conduit 118 is preferably also ensured.

The gas stream supplied to the treatment chamber section 114 is thus preferably a homogenous gas stream having preferably constant temperature, despite the admixing of the heating gas.

In a (not depicted) further embodiment of a treatment installation 100 and/or a circulatory air conduit 118, provision may further be made for heating gas from the main supply line 156 to be suppliable directly into a base channel 204 in order to ultimately more intensely heat individual regions of the treatment chamber section 114 and/or the workpiece 102 than the remaining regions by means of the additional supply openings 196.

As may be seen in particular in FIG. 5, the main discharge line 158 is preferably integrated into a housing 208 surrounding the treatment chamber section 114.

The housing 208 is for example configured to be substantially parallelepipedal. The main discharge line 158 is for example formed by dividing a part of the parallelepipedal interior of the housing 208. In particular, provision may hereby be made for an upper corner region of the interior of the housing 208 to be divided from the treatment chamber section to produce the main supply line 158.

The main supply line 156, in contrast, is preferably arranged outside of the housing 208. Provision may also be made, however, for the main supply line 156 to also be formed by dividing a region of the interior of the housing 208. The previously described circulatory air module 116 and the circulatory air conduit 118 hereby realized preferably function as follows:

A gas stream is preferably driven and supplied first to the pressure chamber 190 by means of the blower 120.

The gas stream is introduced into the treatment chamber section 114 via supply openings 196, which may optionally be provided with valves.

In said treatment chamber section 114, preferably at least one workpiece 102 is arranged, which, by the gas stream flowing around it, receives heat from the gas stream and is hereby heated. In particular, the workpiece 102 is hereby dried.

The gas guided through the treatment chamber 114 is removed via one or more return openings 198 and a return line 192 and is supplied to a suction chamber 194. The gas located in the suction chamber 194 is finally again drawn therefrom by the one or more blowers 120, such that a circuit for the gas guided through the treatment chamber section 114 is formed.

In the operation of the treatment installation 100, the gas guided in the circuit is cooled, in particularly due to the heat transfer to the workpieces 102.

Heat must thus be supplied continuously or regularly.

This occurs by supplying heating gas from the heating installation 126, which is heated compared to the gas stream guided in the circulatory air conduit 118.

Said heating gas is provided via the main supply line 156 and, as needed, branches off via the supply channel 206 and is supplied to the suction chamber 194. In particular, the heating gas is, as needed, drawn out of the main supply line 156 by means of the one or more blowers 120 through the connection of the supply channel 206 to the suction chamber 194.

Preferably simultaneously, a portion of the gas stream guided in the circulatory air conduit 118 is removed from the circulatory air conduit 118 via the discharge openings 200, which are formed in particular by valves, for example one or more outlet valves 124. In particular, a total volumetric flow of the gas stream guided in the circulatory air conduit 118 is held constant, despite the supply of heating gas.

The removed gas is removed via the main discharge line 158.

A treatment installation 100 preferably comprises, for example in accordance with one of FIG. 1 to 3 or 11, multiple of the circulatory air modules 116 and/or treatment chamber sections 114 depicted in FIGS. 4 to 10. The gas stream guided in the respective circulatory air conduit 118 is preferably able to flow through the circulatory air modules 116 and/or treatment chamber sections 114, perpendicularly to the conveying direction 110. A transverse flow between two or more circulatory air modules 116 and/or circulatory air conduits 118 is preferably minimal.

A transverse flow having a component parallel to the conveying direction 110 preferably arises merely due to fresh gas supplied to the treatment chamber 112 and/or due to the removal of exhaust gas from the treatment chamber 112 (see in particular FIGS. 1 and 2).

The described embodiments of the treatment installation 100 and/or the circulatory air module 116 and/or the circulatory air conduit 118 and/or the treatment chamber sections 114 are suited in particular for use in a so-called transverse guidance manner, in which the workpieces 102, in particular the vehicle bodies 106, are conveyed transversely, in particular perpendicularly, to the conveying direction 110 through the treatment chamber 112. In particular, a vehicle longitudinal axis is thereby oriented horizontally and substantially perpendicularly to the conveying direction 110.

The described embodiments may, however, also be used in a so-called longitudinal conveyance of the workpieces 102, in which the vehicle longitudinal direction is oriented in parallel to the conveying direction 110.

Figure 11:
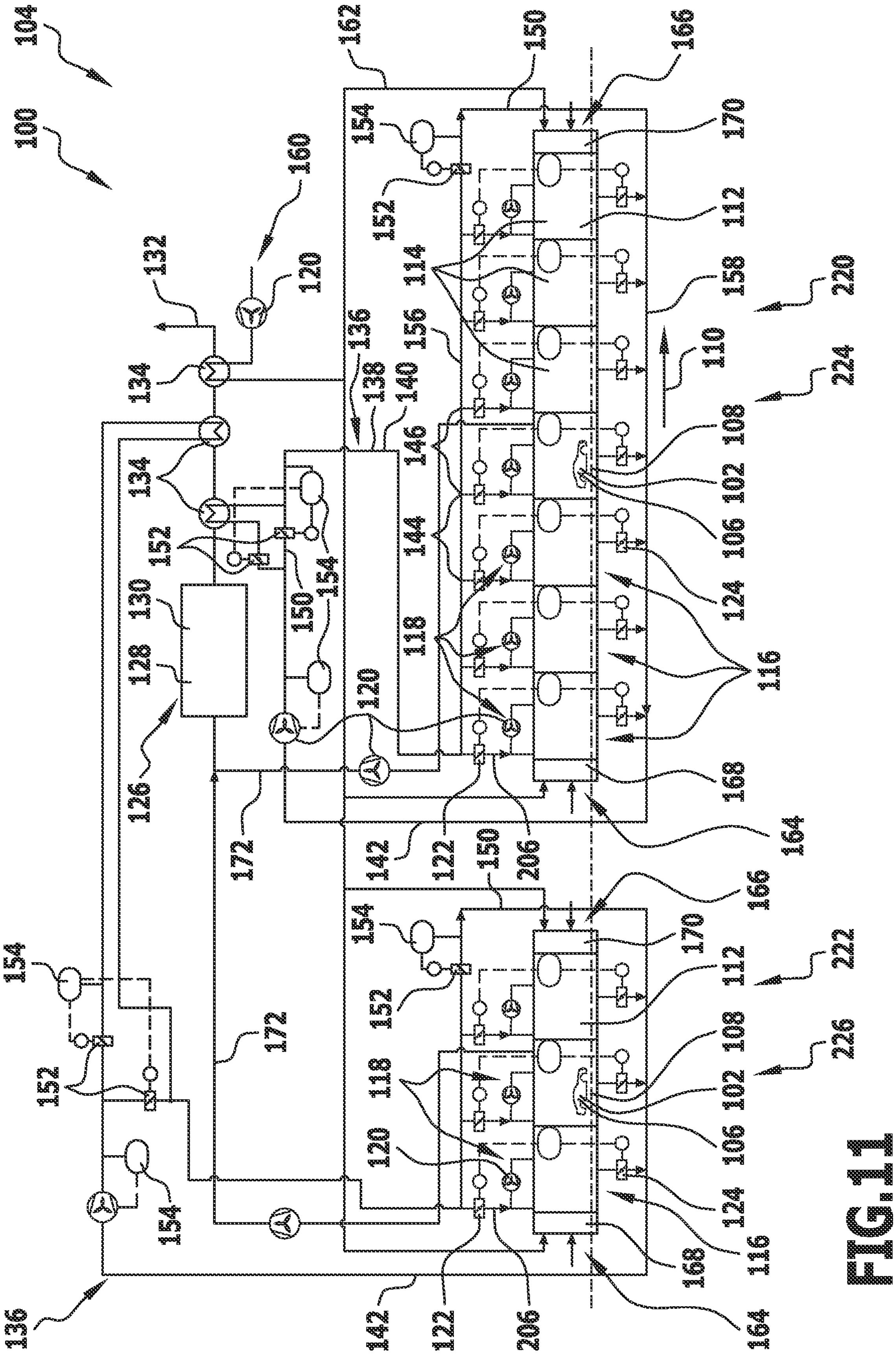
FIG. 11 shows a depiction corresponding to FIG. 1 of a fourth embodiment of a treatment installation in which a pretreatment installation is provided.

A fourth embodiment depicted in FIG. 11 of a treatment installation 100 differs from the first embodiment depicted in FIG. 1 substantially in that the treatment installation 100 comprises a main treatment installation 220 and a pretreatment installation 222.

The main treatment installation 220 is a main drier 224, for example. The pretreatment installation 222 is a predrier 226, for example.

The main treatment installation 220 is preferably configured to be substantially identical to the first embodiment of a treatment installation described with respect to FIG. 1.

The pretreatment installation 222 is thus an optional addition for a treatment installation 100 in accordance with one of the described embodiments, in particular the first embodiment.

The pretreatment installation is preferably substantially also a treatment installation 100 in accordance with any one of the described embodiments, in particular in accordance with the first embodiment.

It may be favorable if the pretreatment installation 222 has smaller dimensions than the main treatment installation 220. For example, provision may be made for the pretreatment installation 222 to comprise a smaller treatment chamber 112 and/or preferably fewer treatment chamber sections 114 than the main treatment installation 220.

For example, provision may be made for a pretreatment installation 222 to comprise merely three or four treatment chamber sections 114.

The pretreatment installation 222 preferably comprises a heating gas conduit 136 that is different and/or independent from the heating gas conduit 136 of the main treatment installation 220.

Heating gas is preferably suppliable to the circulatory air modules 116 and/or treatment chamber sections 114 of the pretreatment installation 222, independently of the heating gas conduit 136 of the main treatment installation 220.

The heating gas conduit 136 of the pretreatment installation 222 is preferably thermally coupled to the exhaust gas discharge line 132 of the heating device 128 by means of a separate heat exchanger 134.

The heat exchanger 134 for thermally coupling the pretreatment installation 222 to the exhaust gas discharge line 132 of the heating device 128 may be arranged, with respect to the flow direction of the exhaust gas of the heating device 128 in the exhaust gas discharge line 132, upstream or downstream of the heat exchanger 134 for thermally coupling the main treatment installation 220 to the exhaust gas discharge line 132 of the heating device 128. The heat exchanger 134 of the pretreatment installation 222 is preferably arranged downstream of the heat exchanger 134 of the main treatment installation 220.

The heat exchanger 134 for coupling the fresh gas supply 160 to the exhaust gas discharge line 132 of the heating device 128 is preferably arranged downstream of the heat exchanger 134 of the main treatment installation 220 and/or downstream of the heat exchanger 134 of the pretreatment installation 222. The use of the heat present in the exhaust gas of the heating device 128 may hereby be optimized due to the mostly low fresh gas temperature (fresh air temperature).

The entire treatment installation 100 preferably comprises one single heating device 128, by means of which the heat may be provided for the heating gas conduit 136 of the main treatment installation 220 and for the heating gas conduit 136 of the pretreatment installation 222.

The treatment installation 100 may comprise a shared fresh gas supply 160 for supplying fresh gas to the treatment chamber 112 of the main treatment installation 220 and to the treatment chamber 112 of the pretreatment installation 222.

Alternatively hereto, provision may also be made for the treatment installation 100 to comprise two fresh gas supplies 160, wherein a fresh gas supply 160 is associated with the main treatment installation 220 and a further fresh gas supply 160 is associated with the pretreatment installation 222 (not depicted in the Figures).

An exhaust gas from the pretreatment installation 222 is preferably suppliable to the exhaust gas discharge 172 of the main treatment installation 220 by means of an exhaust gas discharge 172 of the pretreatment installation 222.

The exhaust gas from the pretreatment installation 222 is thus preferably suppliable together with the exhaust gas from the main treatment installation 220 to the common heating device 128.

The workpieces 102 to be treated are preferably conveyable by means of a conveying device 108, in particular one single conveying device 108, first through the treatment chamber 112 of the pretreatment installation 222 and then through the treatment chamber 112 of the main treatment installation 220.

In FIG. 11, the pretreatment installation 222 and the main treatment installation 220 are depicted spaced apart from each other. This preferably serves merely to illustrate the functioning. Provision may also be made, however, for the pretreatment installation 222 and the main treatment installation 220 to be arranged immediately successively. For example, an airlock configured as an intermediate airlock may fluidically separate the otherwise immediately adjoining treatment chambers 112 from each other. The intermediate airlock thus forms both an outlet airlock 170 of the treatment installation 222 and an inlet airlock 168 of the main treatment installation 220.

Therein that the pretreatment installation 222 is provided in addition to the main treatment installation 220 and comprises a separate heating gas conduit 136, a simple and efficient subdivision of treatment chamber 112 belonging altogether to the treatment installation 100 may be achieved, in particular in the case of significant evaporation from the workpieces 102 or in the case of other significant contamination of the gas streams guided through the treatment chamber sections 114.

In all other respects, the treatment installation 100, in particular the main treatment installation 220 and the pretreatment installation 222, each taken individually, correspond with respect to construction and function with the first embodiment depicted in FIG. 1, such that reference is made to their preceding description in that respect.

Figure 12:
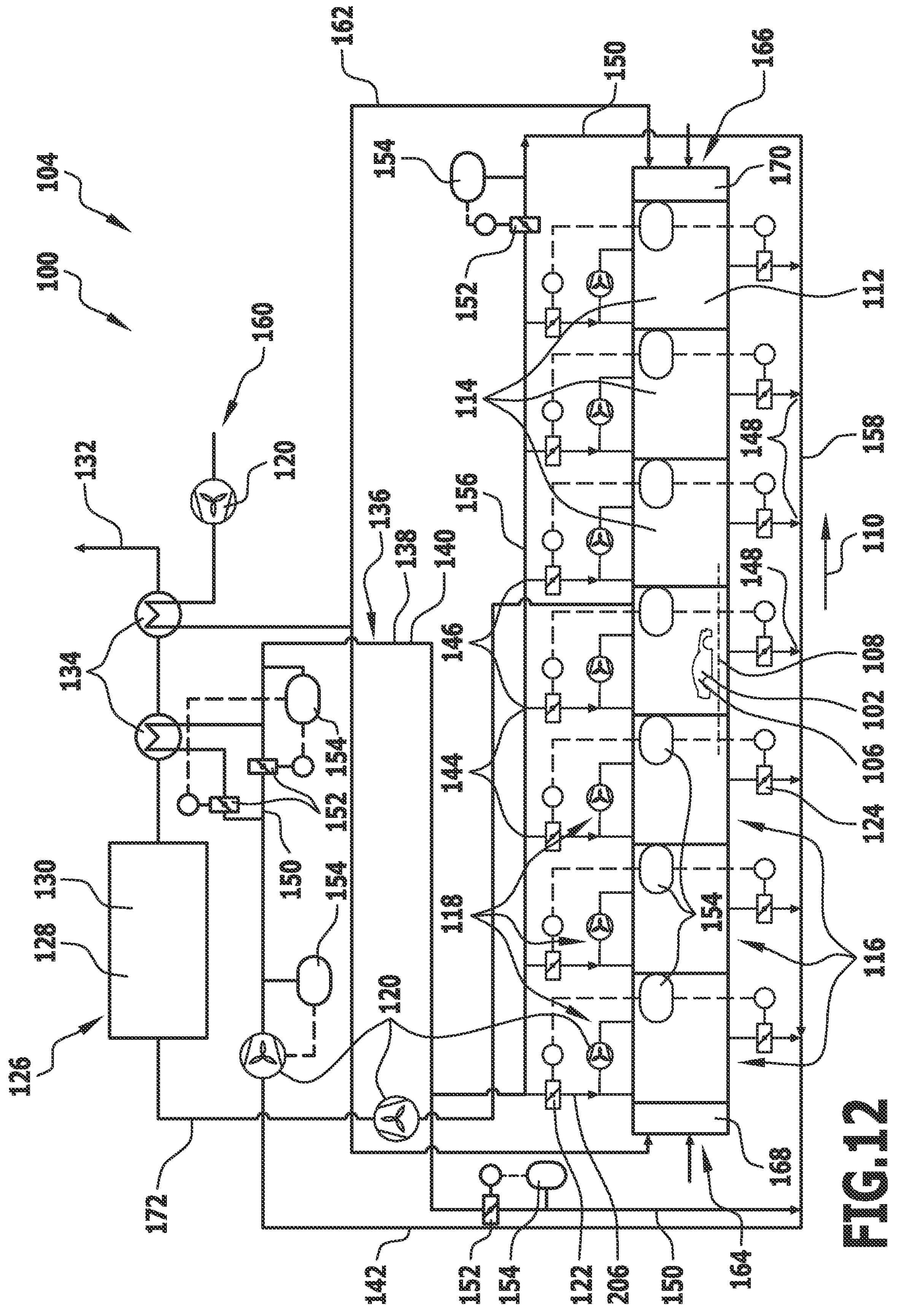
FIG. 12 shows a depiction corresponding to FIG. 1 of a fifth embodiment of a treatment installation in which an additional or alternative bypass line is provided.

A fifth embodiment depicted in FIG. 12 of a treatment installation 100 differs from the first embodiment depicted in FIG. 1 substantially in that the heating gas conduit 136 comprises an additional bypass line 150 by means of which a partial gas stream of the heating gas total stream to be supplied to the circulatory air conduits 118 via the supply section 140 of the heating gas line 138 is guidable past all circulatory air modules 116 and/or treatment chamber sections 114 and is suppliable directly to the removal section 142.

The additional bypass line 150 branches off out of the supply section 140 of the heating gas line 138, in particular upstream of the main supply line 156, in particular upstream of all branchings 144 and/or bifurcations 146.

The additional bypass line 150 is preferably arranged at a front end of the main supply line 156 and/or the main discharge line 158, with respect to the conveying direction 110 of the conveying device 108, i.e. preferably in the region of an entry section 164 of the treatment installation 100.

A volumetric flow of the heating gas stream guided via the bypass line 150 past the circulatory air conduits 118 is preferably controllable and/or regulatable by means of a bypass valve 152.

The additional bypass line 150 preferably opens into the removal section 142, in particular downstream of the main discharge line 158, for example downstream of all junctions 148.

By using such an additional bypass line 150, a partial gas stream from the supply section 140 may preferably be guided past the circulatory air modules 116 and/or circulatory air conduits 118 by circumventing the main supply line 156 and the main discharge line 158. As a result, relatively hot gas may be introduced directly into the removal section 142 in order to heat the gas stream to be entirely removed by means of the removal section 142.

The gas stream is thereby heated in particular to a temperature which prevents an undesired formation of condensation.

By means of the control device 154, the bypass valve 152 of the bypass line 150 and thus the supply of hot gas to the removal section 142 is preferably controlled in such a way that an actual temperature of the gas stream guided in the removal section 142 is always above the condensation temperature. In particular, a regulation on the basis of a specified minimal desired temperature value is provided.

In all other respects, the fifth embodiment depicted in FIG. 12 of the treatment installation 100 corresponds with respect to construction and function with the first embodiment depicted in FIG. 1, such that reference is made to its preceding description in that respect.

Figure 13:
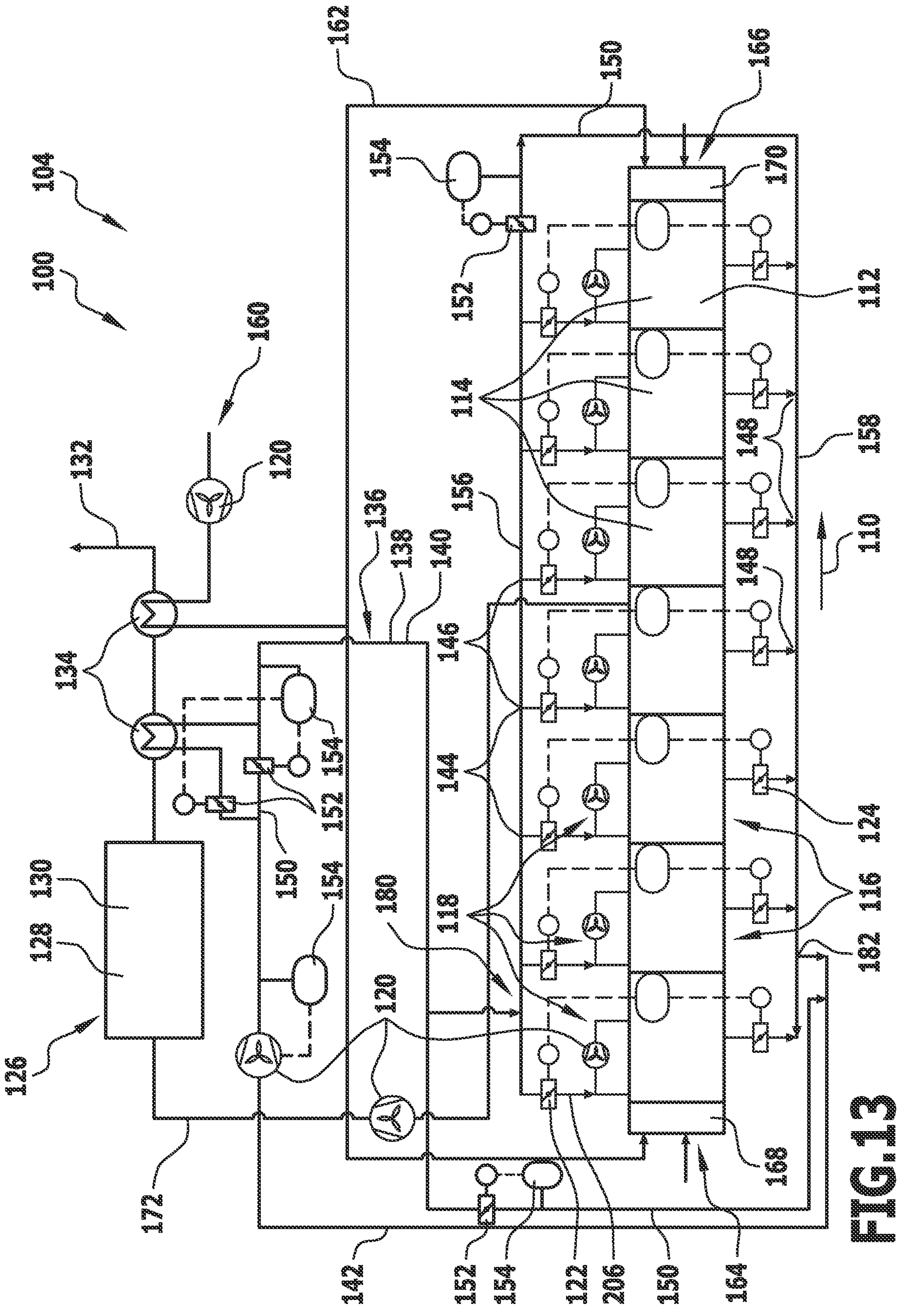
FIG. 13 shows a depiction corresponding to FIG. 1 of a sixth embodiment of a treatment installation in which an additional or alternative bypass line is provided.

A sixth embodiment depicted in FIG. 13 of a treatment installation 100 differs from a second embodiment depicted in FIG. 2 substantially in that, corresponding to the fifth embodiment depicted in FIG. 12, an additional bypass line 150 is provided.

The sixth embodiment of a treatment installation 100 thus corresponds with respect to the basic construction and the basic function with second embodiment depicted in FIG. 2, such that reference is made to its preceding description in that respect. With respect to the addition bypass line 150, the sixth embodiment of a treatment installation 100 corresponds to the fifth embodiment depicted in FIG. 12, such that reference is made to its preceding description in that respect.

In further (not depicted) embodiments, individual or multiple bypass lines 150 may be supplemented or omitted as needed. For example, the embodiment depicted in FIG. 3 of a treatment installation 100 may also be provided with an additional bypass line 150 as needed, in accordance with the fifth embodiment depicted in FIG. 12.

Figure 14:
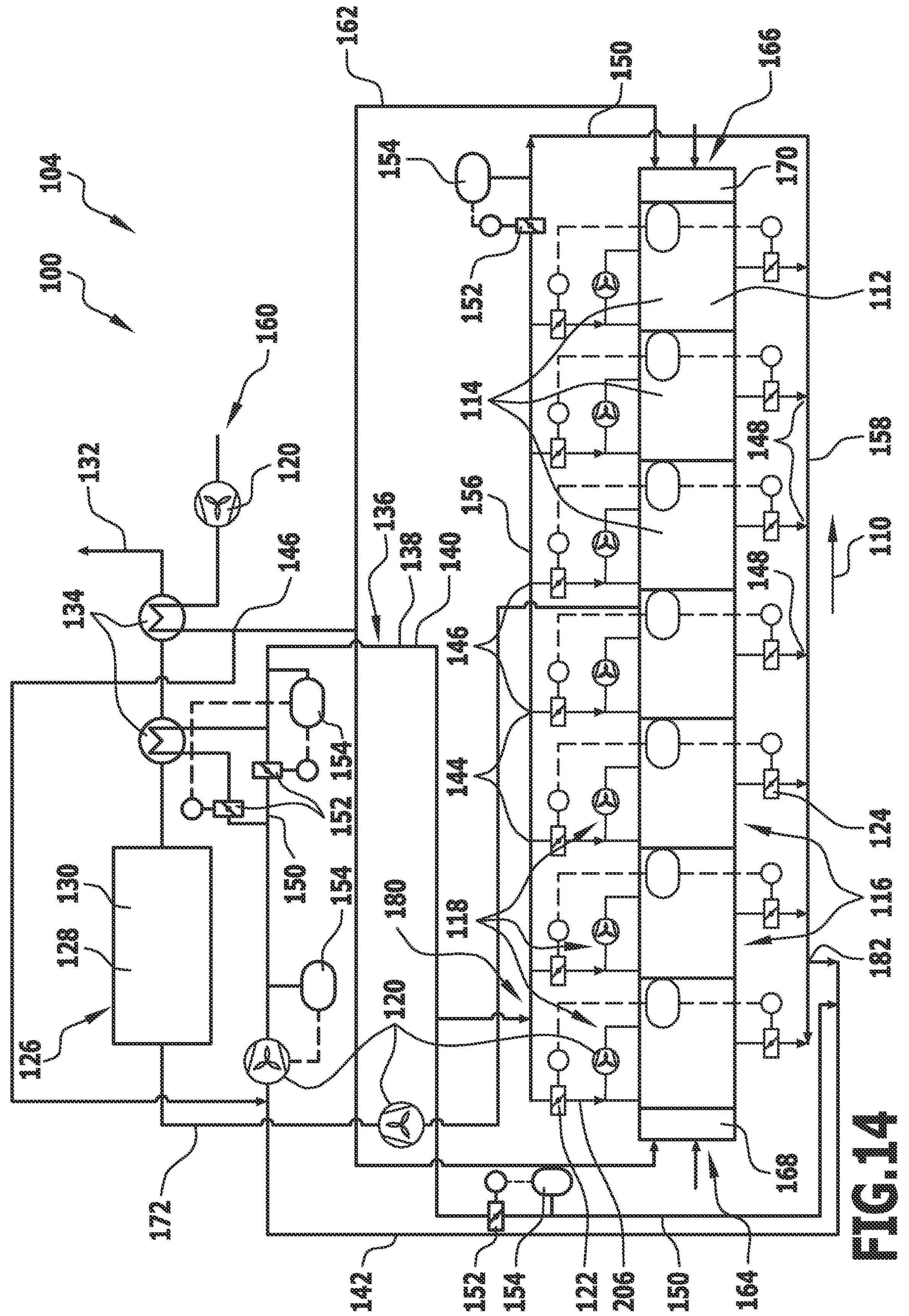
FIG. 14 shows a depiction corresponding to FIG. 1 of a seventh embodiment of a treatment installation in which an alternative fresh air supply is provided.

A seventh embodiment depicted in FIG. 14 of a treatment installation 100 differs from the sixth embodiment depicted in FIG. 13 substantially in that the fresh gas line 162 comprises a bifurcation 146, by means of which different volumetric flows and/or mass flows of the fresh gas are optionally suppliable as airlock gas or as fresh gas supplied in addition to the heating gas stream.

The fresh gas line 162 thereby opens into the inlet airlock 168 and the outlet airlock 170, on the one side, and into the heating gas conduit 136, for example into the removal section 142 of the heating gas conduit 136, on the other.

Provision may be made for a constant fresh gas stream to, by means of such a fresh gas supply 160, be used as airlock gas and hereby be supplied to the treatment chamber 112. A variable amount of the supplied fresh gas, which depends in particular on the parameters varying in the treatment chamber 112, is preferably supplied to the heating gas stream in the heating gas conduit 136. In particular, a supply upstream of the blower 120 and/or the heat exchanger 134 of the heating gas conduit 136 is hereby provided in order to be able to condition the heating gas stream mixed with the fresh gas, before being supplied to the treatment chamber 112.

In all other respects, the seventh embodiment depicted in FIG. 14 of the treatment installation 100 corresponds with respect to construction and function with the sixth embodiment depicted in FIG. 13, such that reference is made to its preceding description in that respect.

Figure 15:
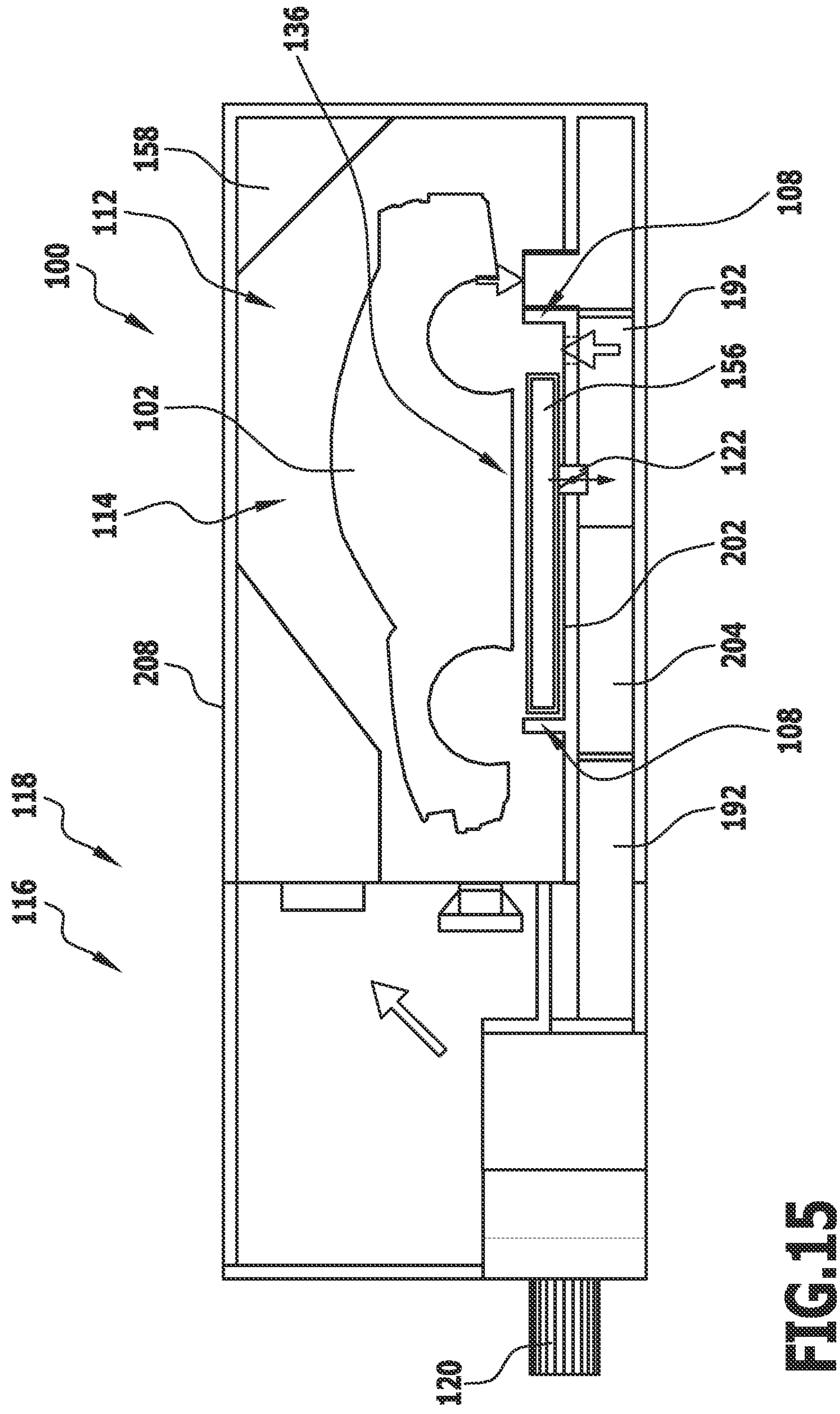
FIG. 15 shows a depiction corresponding to FIG. 9 of an alternative embodiment of a treatment installation in which a main supply line, guided under the workpieces to be treated and within the treatment chamber, is provided.

An eighth embodiment depicted in FIG. 15 of a treatment installation 100 differs substantially from the embodiment depicted in FIGS. 4 to 10 substantially in that the main supply line 156 of the heating gas conduit 136 runs within the treatment chamber 112.

The main supply line 156 thereby extends in particular beneath the workpieces 102 to be treated.

The main supply line 156 is configured in particular as, for example flat, rectangular channel and is fixed to a base 202 of the treatment chamber 112.

Such a configuration enables in particular forgoing a thermal insulation of the main supply line 156.

Simple admix flaps are preferably provided as inlet valves 122 between the main supply line 156 and a return line 192 of each one circulatory air module 116. Separate supply channels 206 may thus also be expendable.

In particular, the main supply line 156 is arranged between two materials handling strands of the conveying device 108.

The main supply line 156 may for example serve as a radiation element for heating the workpieces 102 within the treatment chamber 112.

A flow direction of the heating gas guided in the main supply line 156 preferably corresponds to the conveying direction 110 of the conveying device 108.

In all other respects, the embodiment depicted in FIG. 15 of the treatment installation 100 corresponds with respect to construction and function with the embodiments depicted in FIGS. 4 to 10, such that reference is made the their preceding description in that respect.

In FIGS. 16 to 21, various embodiments of heat exchanger devices 300 are depicted, which may form and/or replace individual or multiple of the previously described heat exchangers 134.

In particular, provision may be made for multiple of the previously described heat exchangers 134 to be jointly formed by one of the subsequently described heat exchanger devices 300.

Figure 16:
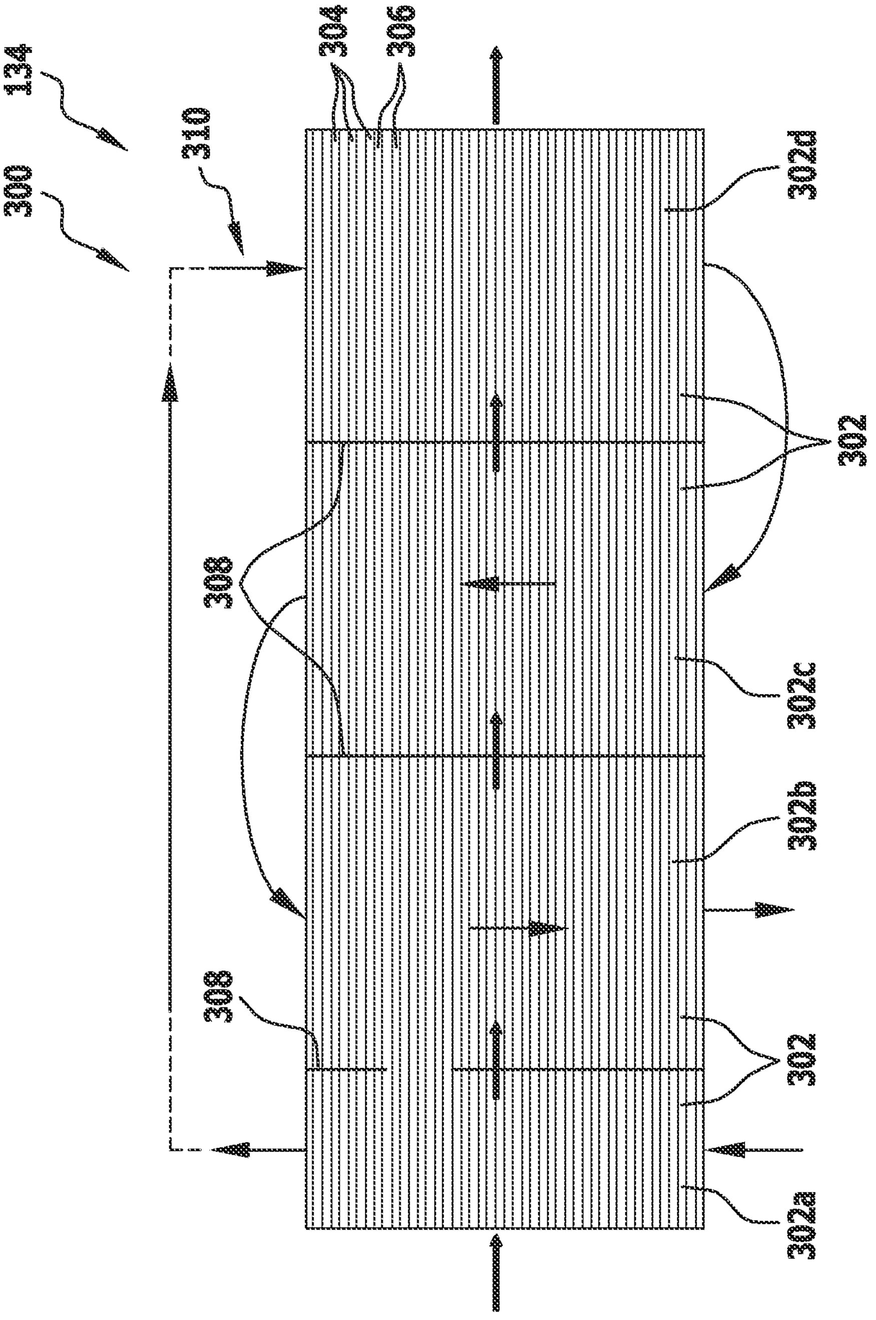
FIG. 16 shows a first embodiment of a heat exchanger device in which a cold gas to be heated is suppliable varyingly to hotter and colder heat transfer stages.

A first embodiment depicted in FIG. 16 of a heat exchanger device 300 comprises multiple heat transfer stages 302 through which a cold gas to be heated is consecutively guidable.

Also a heat-emitting hot gas flows consecutively through the heat transfer stages 302.

The hot gas thereby flows for example through a multitude of hollow-cylindrical tubes 304 which extend linearly through for example four heat transfer stages 302.

The heat transfer stages 302 are thereby for example a first heat transfer stage **302*a*, a second heat transfer stage 302*b*, a third heat transfer stage 302*c*, and a fourth heat transfer stage 302*d***.

The cold gas flows through a chamber 306 surrounding the hollow-cylindrical tubes 304.

The chamber 306 surrounding the hollow cylindrical tubes 304 is subdivided by means of multiple dividing elements 308, whereby the heat transfer stages 302 divided from each other arise.

The dividing elements 308 extend in particular substantially perpendicularly to a longitudinal direction of the hollow-cylindrical tubes 304.

The heat-emitting hot gas and the heat-absorbing cold gas flow, on the one hand, through the heat transfer stages 302, in particular in cross-flow.

The heat transfer stages 302 may, for example, have different dimensions, in particular depending on the position of the dividing elements 308 along the hollow cylindrical tubes 304.

For example, a comparatively narrow first heat transfer stage 302*a* may be provided, to which three larger or wider heat exchanger stages 302*b*, 302*c*, 302*d* connect.

The heat transfer stages 302, in particular the chambers 306 of the heat transfer stages 302 which surround the hollow-cylindrical tubes 304 and are separated from each other by means of the dividing elements 308, are fluidically connected to each other by means of a gas conduit 310 in such a way that, for example, the cold gas may consecutively flow through the heat transfer stages 302 in a specified sequence.

In the first embodiment depicted in FIG. 16 of the heat exchanger device 300, provision is made for the cold gas to first flow through the first heat transfer stage 302*a* and then consecutively be guided through the fourth heat transfer stage 302*d*, then through the third heat transfer stage 302*c*, and finally through the second heat transfer stage 302*b*.

Since the hot gas flows through the heat transfer stages 302 in ascending sequence, the temperature decreases in the heat transfer stages 302, starting from the first heat transfer stage 302*a* to the fourth heat transfer stage 302*d*. The cold gas thus flows first through the hottest heat transfer stage 302 and then the remaining heat transfer stages 302 consecutively with increasing temperature level.

By means of the suitable design of the heat exchanger device 300, an undesired overheating of the cold gas to be heated may in particular be avoided. As a result, in particular the risk of a material transformation of individual constituents of the cold gas may be reduced or entirely avoided.

Figure 17:
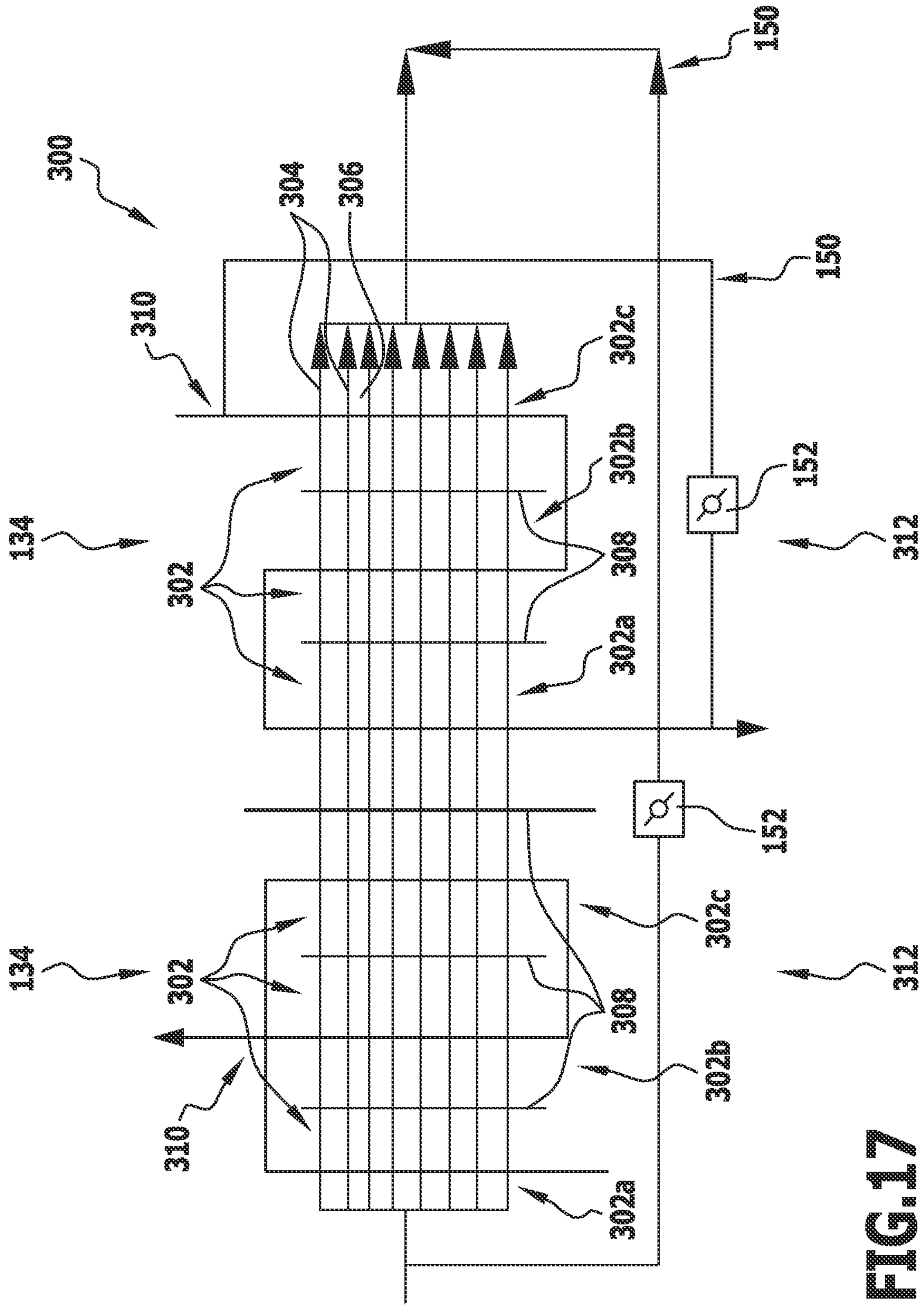
FIG. 17 shows a depiction corresponding to FIG. 16 of a second embodiment of a heat exchanger device in which two heat transfer section are provided, wherein a separate cold gas is suppliable to each heat transfer section.

A second embodiment depicted in FIG. 17 of a heat exchanger device 300 differs from the first embodiment depicted in FIG. 16 substantially in that the heat exchanger device 300 comprises two separate heat transfer section 312.

A different cold gas to be heated is thereby associated with each heat transfer section 312.

A heat transfer section 312 for heating a heating gas stream, for example, is thereby provided upstream with respect to a flow direction of the hot gas. Downstream therefrom, a heat transfer section 312 for heating a fresh gas stream is provided, for example.

The heat transfer sections 312 are in themselves each subdivided into three heat transfer stages 302.

The heating gas thereby flows, for example, through the heat transfer section 312 for heating the heating gas stream, in such a way that the heating gas flows consecutively through a first heat transfer stage 302*a*, then a third heat transfer stage 302*c*, and lastly a second heat transfer stage 302*b*.

However, the hot gas and the cold gas preferably flow in the same sequence through the heat transfer stages 302 of the heat transfer section 312 for heating the fresh gas, i.e. consecutively the first heat transfer stage 302*a*, then the second heat transfer stage 302*b*, and finally the third heat transfer stage 302.

The second embodiment depicted in FIG. 17 of the heat exchanger device 300 is thus in particular a combo heat exchanger by means of which two different cold gases are heatable using one single hot gas.

As may be further seen in FIG. 17, provision may be made for the heat exchanger device 300 to comprise one or more bypass lines 150 by means of which for example hot gas is guidable past one or more heat transfer stages 302. Alternatively or in addition hereto, provision may further be made for one or more cold gas streams to be guidable past the corresponding one or more heat transfer stages 302 by means of one or more bypass lines 150.

In particular a bypass valve 152 may be provided for controlling the respective bypass volumetric stream.

In all other respects, the second embodiment depicted in FIG. 17 of the heat exchanger device 300 corresponds with respect to construction and function with the first embodiment depicted in FIG. 16, such that reference is made to its preceding description in that respect.

Figure 18:
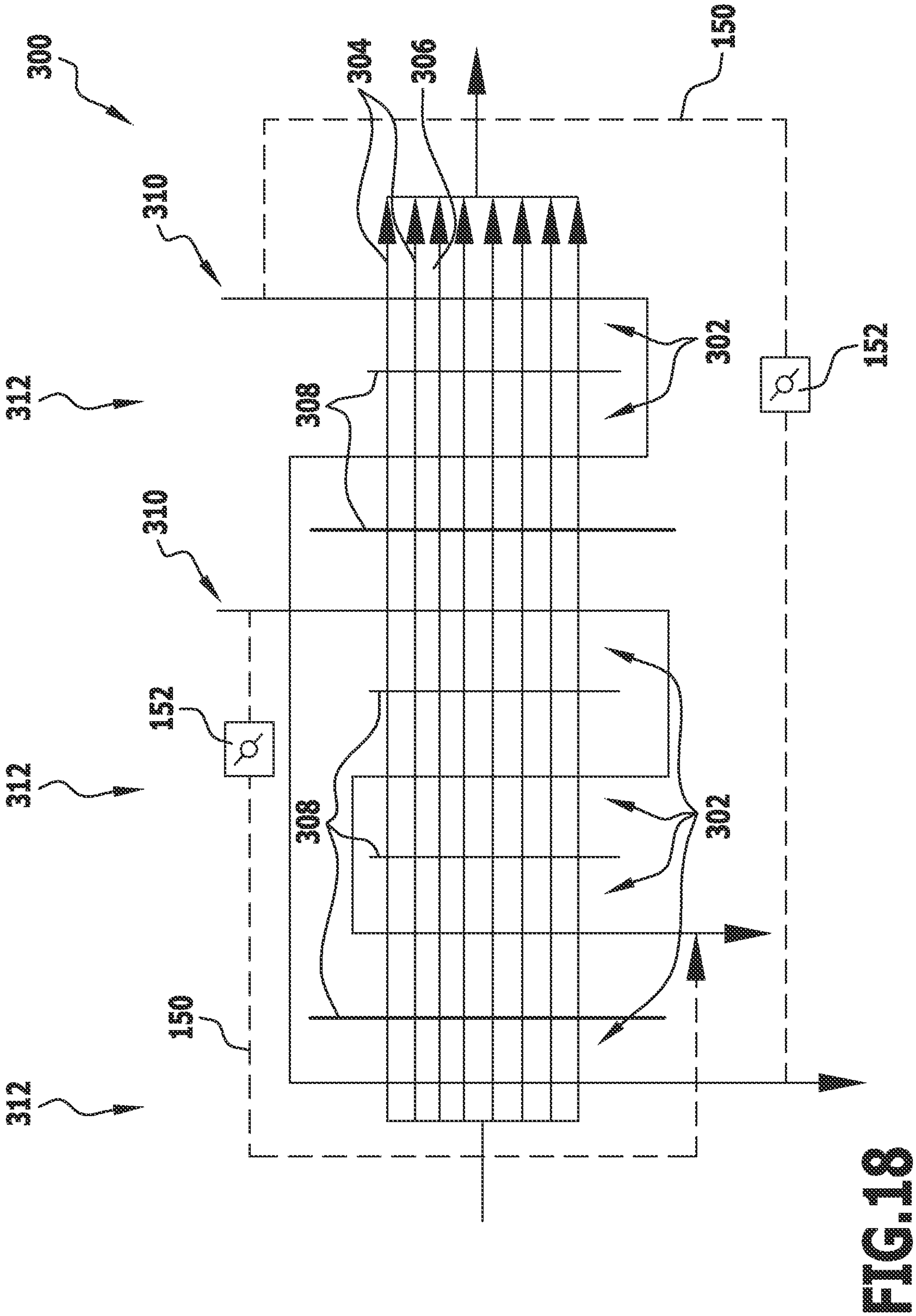
FIG. 18 shows a depiction corresponding to FIG. 16 of a third embodiment of a heat exchanger device in which three heat transfer sections are provided, wherein a first cold gas is able to flow through a middle heat transfer section, and wherein one and the same further cold gas is able to flow through a first and a least heat transfer section.

A third embodiment depicted in FIG. 18 of a heat exchanger device 300 differs from the second embodiment depicted in FIG. 17 substantially in that two heat transfer sections 312 for heating a cold gas, in particular the fresh gas stream, are provided, wherein between these two heat transfer sections 312 is provided a heat transfer section 312 for heating another cold gas, in particular the heating gas stream.

The two heat transfer sections 312, which are arranged on both sides of the further heat transfer section 312, thus together form the heat transfer stages 302 for heating a cold gas, in particular the fresh gas stream.

The first heat transfer stage 302*a* is thereby arranged, for example, upstream of the entire heat transfer section 312 for heating the heating gas stream, with respect to the hot gas stream, while the two further heat transfer stages 302*b*, 302*c* for heating the fresh gas stream are arranged downstream of the heat transfer section 312 for heating the heating gas stream.

In particular an overheating of the heating gas stream may be reduced by means of the design in accordance with FIG. 18 in that the hot gas stream is first cooled with the fresh gas stream before it is used for heating up the heating gas stream.

In all other respects, the third embodiment depicted in FIG. 18 of the heat exchanger device 300 corresponds with respect to construction and function with the second embodiment depicted in FIG. 17, such that reference is made to it preceding description in that respect.

Figure 19:
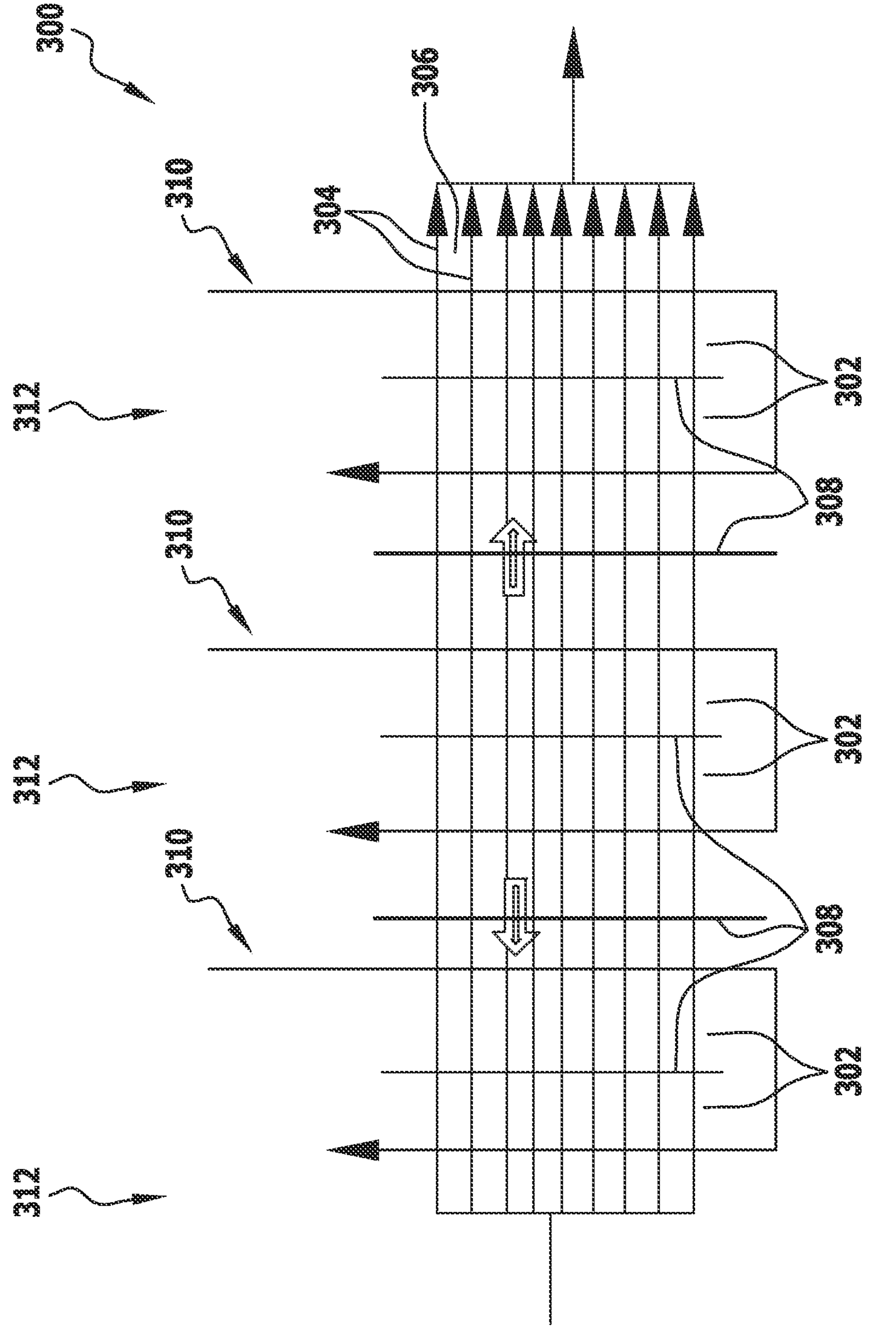
FIG. 19 shows a schematic depiction corresponding to FIG. 16 of a fourth embodiment of a heat exchanger device in which three heat transfer sections for three different cold gases are provided.

A fourth embodiment depicted in FIG. 19 of a heat exchanger device 300 differs from the second embodiment depicted in FIG. 17 substantially in that three heat transfer sections 312 for three different cold gases are provided.

Each heat transfer section 312 preferably comprises two heat transfer stages 302.

With respect to the flow direction of the hot gas, a heat transfer section 312 for heating a heating gas stream for a main drier, a heat transfer section 312 for heating a heating gas stream for a predrier, and finally a heat transfer section 312 for heating a fresh gas stream are preferably consecutively arranged in succession.

A pressure drop within the entire heat exchanger device 300, in particular within the entire chamber 306 surrounding the hollow-cylindrical tubes 304, is preferably selected such that possible leakage streams, which flow through the dividing elements 308 from a heat transfer stage 302 to the adjacent one, do not cause and undesired condensation.

For example, provision may be made for a pressure in the middle heat transfer section 312 to be selected higher than in the adjacent heat transfer sections 312 such that cold gas guided in the middle heat transfer section 312, in particular the heating gas stream for the predrier, enters the adjacent heat transfer sections 312 and not vice versa. In particular, it may hereby preferably be avoided that hot gas with high risk of condensation enters colder regions (heat transfer stages 302) of the heat exchanger device 300.

In all other respects, the fourth embodiment depicted in FIG. 19 of the heat exchanger device 300 corresponds with respect to construction and function with the second embodiment depicted in FIG. 17, such that reference is made to its preceding description in that respect.

Figure 20:
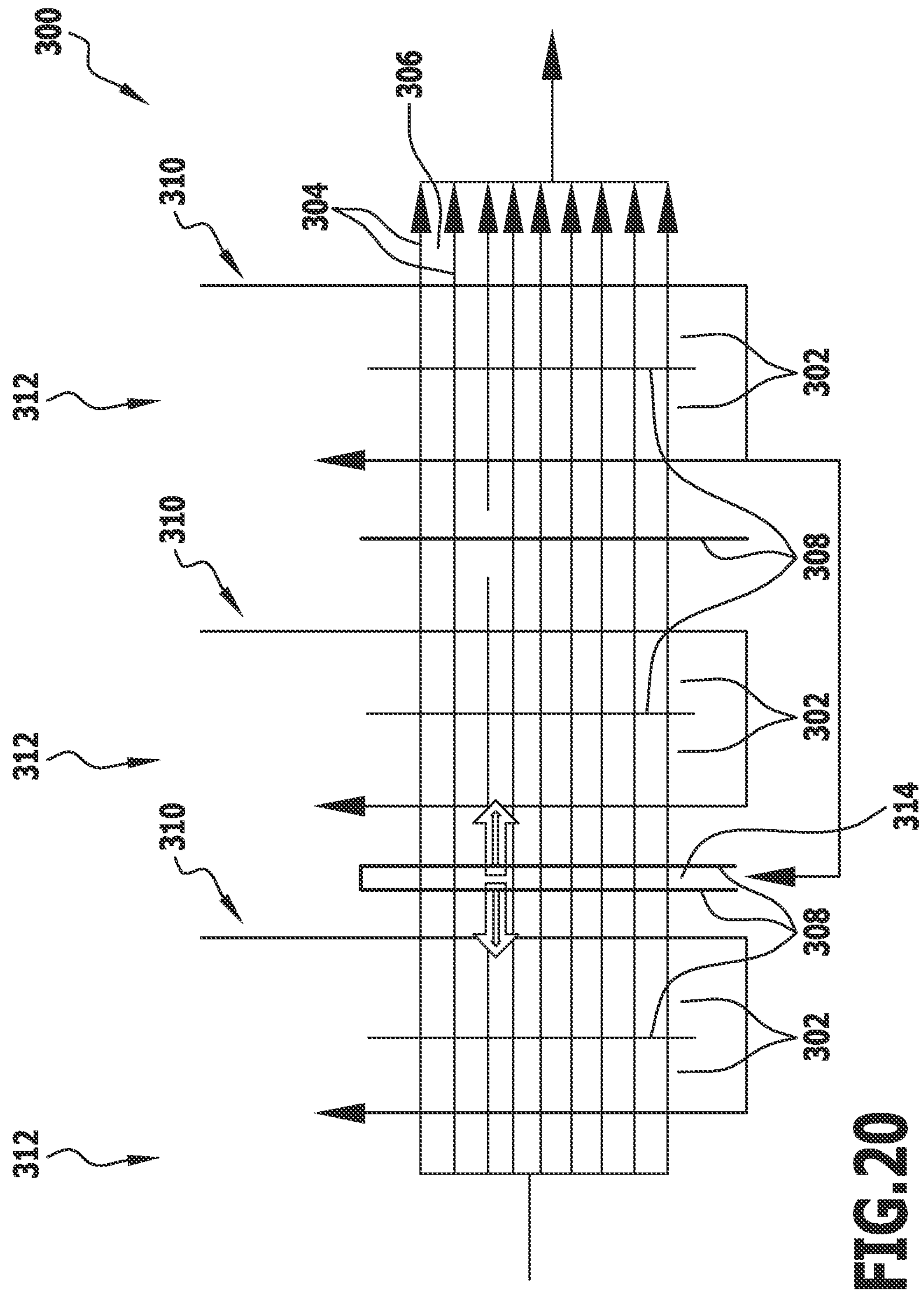
FIG. 20 shows a schematic depiction corresponding to FIG. 16 of a fifth embodiment of a heat exchanger device in which two heat transfer section are separated from each other by means of two dividing elements, wherein an intermediate space between the two dividing elements are flushed with sealing air.

A fifth embodiment depicted in FIG. 20 of a heat exchanger device 300 differs from the fourth embodiment depicted in FIG. 19 substantially in that two dividing elements 308 are arranged between two adjacent heat transfer sections 312.

A gap region 314 between the two dividing elements 308 is then flushable for example with a sealing gas, for example sealing air, in particular fresh gas. As a result, an undesired gas exchange between adjacent heat transfer sections 312 may effectively be avoided.

In all other respects, the fifth embodiment depicted in FIG. 20 of the heat exchanger device 300 corresponds with respect to construction and function with the fourth embodiment depicted FIG. 19, such that reference is made to its preceding description in that respect.

Figure 21:
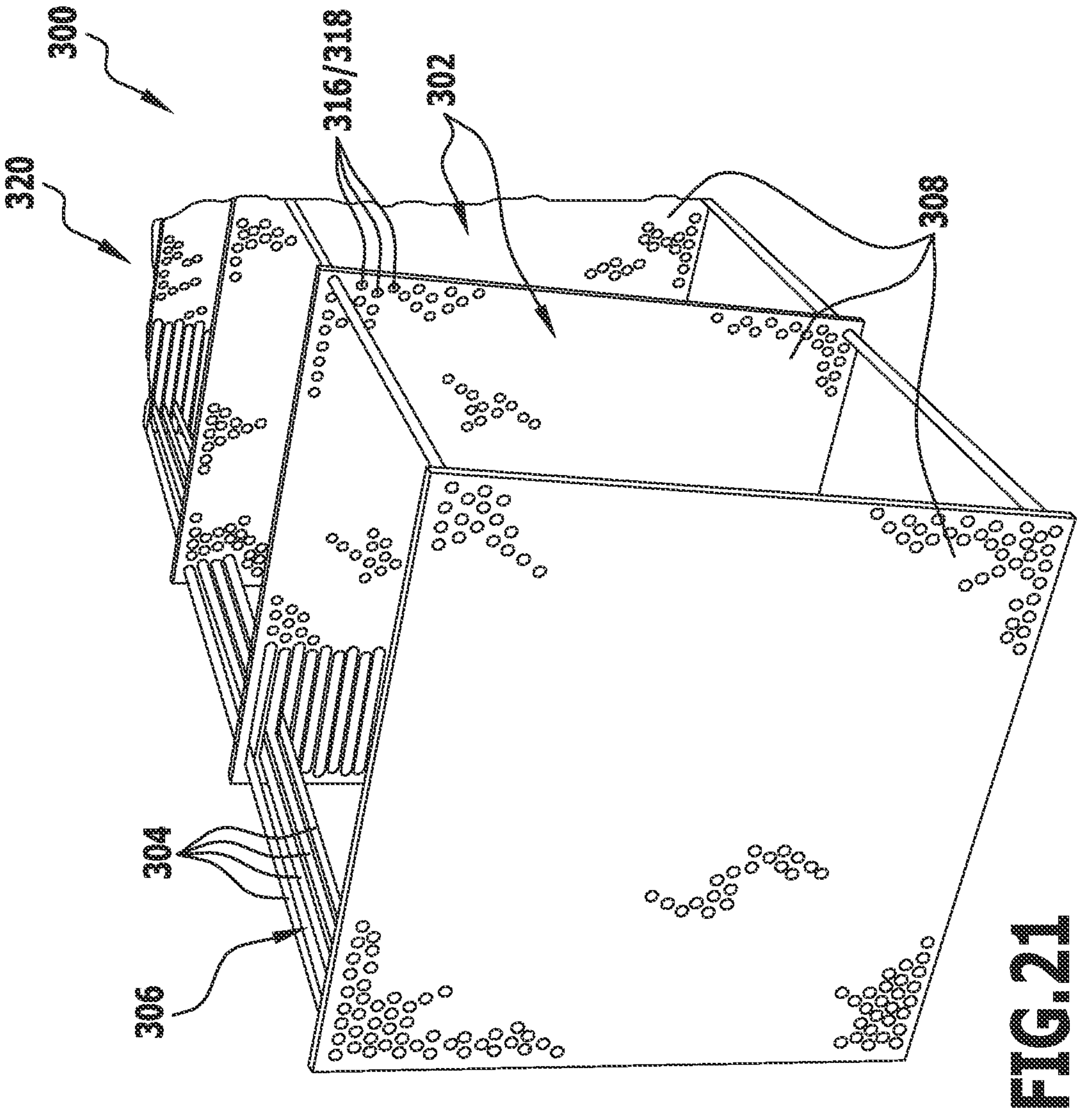
FIG. 21 shows a schematic perspective depiction of a sixth embodiment of a heat exchanger device, which comprises a multitude of heat exchanger tubes and multiple dividing plates for separating different heat transfer sections of the heat exchanger device.

A schematic perspective depiction of a heat exchanger device 300 is depicted in FIG. 21.

Merely for example, said depiction contains the hollow-cylindrical tubes 304 as well as the dividing elements 308. The dividing elements 308 are thereby provided with passages 316 and/or receivers 318 for the hollow-cylindrical tubes 304. In particular, the dividing elements 308 are slidable onto a bundle of hollow-cylindrical tubes 304.

The dividing elements 308 are in particular configured to be plate-shaped and planar.

The embodiment depicted in FIG. 21 of the heat exchanger device 300 is in particular a tube bundle heat exchanger 320 and may be used to all of the described heat exchangers 134 and/or heat exchanger devices 300.

The invention claimed is:

1. A treatment installation for treating workpieces, the treatment installation comprising:

a treatment chamber including multiple separate treatment chamber sections that are each associated with one of multiple separate circulatory air modules of the treatment installation;

a heating installation including a heating device, a heating gas conduit, and a heat exchanger, wherein the circulatory air modules are fluidly coupled to the heating gas conduit through which a heating gas is guided, the ones of the circulatory air modules to guide a separate circulatory gas stream of heating gas from the heating gas conduit through the respective treatment chamber sections, wherein the heat exchanger transfers heat produced in the heating device to the heating gas of the heating gas conduit; and a removal section of the heating gas conduit to remove gas from ones of the circulatory air modules and to provide the removed gas to the heat exchanger, bypassing the heating device, for reheating it as heating gas.

2. The treatment installation in accordance with claim 1, wherein the heat exchanger is of a multistage configuration.

3. The treatment installation in accordance with claim 2, wherein multiple heat transfer stages of the heat exchanger are at least one of arranged spatially successively in a direction or are fluidly coupled to each other in such a way that a hot gas from a combustion device, which releases heat, flows consecutively through the heat transfer stages in said direction.

4. The treatment installation in accordance with claim 2, wherein a hot gas from a combustion device and a cold gas is to flow through the heat exchanger in such a way that the cold gas flows alternatingly through one or more hotter and one or more colder heat transfer stages with respect to a respective preceding heat transfer stage.

5. The treatment installation in accordance with claim 2, wherein multiple heat exchangers of the treatment installation jointly form a heat exchanger device, and wherein the heat exchangers form heat transfer sections of the heat exchanger device which spatially adjoin each other.

6. The treatment installation in accordance with claim 5, wherein a hot gas, which forms a heat source, is able to flow consecutively through heat transfer stages of all heat transfer sections, wherein multiple cold gases, which form a heat sink and are to be heated by heat transfer from the hot gas, are provided, and wherein in each case one cold gas to be heated is associated with each heat transfer section.

7. The treatment installation in accordance with claim 6, wherein at least one of:

the cold gas is the hot gas;

the cold gas is circulatory air of one or more circulatory air conduits or air circulators; or the cold gas is fresh gas.

8. The treatment installation in accordance with claim 2, wherein the heat exchanger includes a tube bundle heat exchanger which includes multiple hollow-cylindrical tubes, and wherein a chamber surrounding the hollow-cylindrical tubes is divided by multiple dividing plates into at least one of multiple mutually separated heat transfer regions, heat transfer sections or heat transfer stages.

9. The treatment installation in accordance with claim 8, wherein at least one of two heat transfer regions, heat transfer sections, or heat transfer stages are separated from each other by two dividing plates, and wherein a gap region is formed between the two dividing plates, to which gap region sealing air is suppliable.

10. The treatment installation in accordance with claim 1, further including a combustion device for heating the gas guided through the respective multiple separate treatment chamber sections.

11. The treatment installation in accordance with claim 10, wherein the combustion device includes at least one of a gas burner, a gas turbine, or a micro gas turbine, for producing exhaust gas.

12. The treatment installation in accordance with claim 10, wherein one or more circulatory air modules or one or more circulatory air conduits each include one or more injector devices for supplying the heating gas stream to the treatment chamber in accordance with an injector principle.

13. The treatment installation in accordance with claim 12, wherein the heating gas stream is introducible into the treatment chamber by one or more injector nozzles of the respective injector device with a flow rate of at least about 10 m/s.

14. The treatment installation in accordance with claim 12, wherein the heating gas stream is introducible into the treatment chamber by one or more injector nozzles of the respective injector device with a temperature of at least about 150° C.

15. The treatment installation in accordance with claim 1, wherein ones of the circulatory air modules include a respective blower.

16. The treatment installation in accordance with claim 1, further including a pre-treatment installation.

17. The treatment installation in accordance with claim 16, wherein the pre-treatment installation includes a second treatment chamber including respective separate treatment chamber sections with corresponding circulatory air modules.

18. The treatment installation in accordance with claim 17, wherein the second treatment chamber is fluidly coupled to the heating gas conduit.

19. The treatment installation in accordance with claim 1, wherein the heating gas conduit is configured to be annularly closed.

20. The treatment installation in accordance with claim 1, wherein the heating gas conduit includes a circulatory air conduit which is formed in sections by multiple circulatory air modules and/or treatment chamber sections which are arranged in parallel.

21. The treatment installation in accordance with claim 1, wherein the heating gas conduit includes a central heating gas line, by which a heating gas is annularly guidable from the heat exchanger for heating the heating gas to the circulatory air modules and/or the treatment chamber sections and again back to the heat exchanger.

22. The treatment installation in accordance with claim 1, wherein the heating gas guided in the heating gas conduit is drivable by exactly one blower or by multiple blowers.

23. The treatment installation in accordance with claim 1, wherein the heating gas conduit includes multiple bifurcations or branchings for distributing the heating gas, guided in the heating gas conduit, to the circulatory air modules and/or the treatment chamber sections.

24. A method for treating workpieces, the method comprising:

providing multiple gas streams of heated heating gas, guided in separate circulatory gas streams, to flow through multiple separate treatment chamber sections of a treatment chamber of a treatment installation, ones of the treatment chamber sections associated with respective ones of circulatory air modules of the treatment installation, ones of the circulatory air modules to guide the separate circulatory gas stream through respective treatment chamber sections;

heating the circulatory gas streams by a heating gas stream of a heating gas conduit of a heating installation, wherein the heating gas conduit is fluidly coupled to the circulatory air modules and heat that is produced by a heating device of the heating installation is transferred via a heat exchanger of the heating installation to the heating gas stream of the heating gas conduit;

removing, by a removal section of the heating gas conduit, gas from the circulatory air modules; and providing the removed gas to the heat exchanger, bypassing the heating device, for reheating it as heating gas.

25. The method in accordance with claim 24, further including providing the heating gas stream consecutively to multiple heat transfer stages of the heat exchanger for the heating thereof.

26. The method in accordance with claim 24, further including providing an exhaust gas stream from a combustion device to heat the heating gas stream.

* * * * *